US 8,016,531 B2

(12) United States Patent
White et al.

(10) Patent No.: US 8,016,531 B2
(45) Date of Patent: Sep. 13, 2011

(54) AXLE SPINDLE NUT ASSEMBLY FOR HEAVY-DUTY VEHICLES

(75) Inventors: Jay D. White, Massillon, OH (US);
Jeffrey S. Morris, Stow, OH (US);
Donald R. Hester, East Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 177 days.

(21) Appl. No.: 12/482,551

(22) Filed: Jun. 11, 2009

(65) Prior Publication Data
US 2009/0245969 A1 Oct. 1, 2009

Related U.S. Application Data

(63) Continuation-in-part of application No. 11/494,438, filed on Jul. 27, 2006, now abandoned.

(60) Provisional application No. 60/772,077, filed on Feb. 10, 2006, provisional application No. 60/713,889, filed on Sep. 2, 2005.

(51) Int. Cl.
*F16B 39/06* (2006.01)
(52) U.S. Cl. ................ 411/216; 411/221; 301/105.1
(58) Field of Classification Search .................. 411/216, 411/221, 926, 197, 199, 217, 218, 533; 301/105.1
See application file for complete search history.

(56) References Cited

U.S. PATENT DOCUMENTS

| | | | | | |
|---|---|---|---|---|---|
| 913,174 | A | * | 2/1909 | Stall | 411/216 |
| 972,669 | A | * | 10/1910 | Wilt | 411/216 |
| 1,030,146 | A | * | 6/1912 | Wade | 411/221 |
| 1,040,215 | A | * | 10/1912 | Kriner | 411/197 |
| 1,231,840 | A | * | 7/1917 | Bolt | 411/140 |
| 1,420,737 | A | * | 6/1922 | Palmgren | 411/204 |
| 6,290,442 | B1 | * | 9/2001 | Peterkort | 411/140 |

* cited by examiner

*Primary Examiner* — Gary Estremsky
(74) *Attorney, Agent, or Firm* — Krugliak, Wilkins, Griffiths & Dougherty Co., L.P.A.; David P. Dureska; Edward T. Kennedy

(57) ABSTRACT

An axle spindle nut assembly secures a wheel end assembly on an axle spindle. The wheel end assembly includes outboard and inboard outboard bearings that are immovably mounted on the axle spindle, and a wheel hub which is rotatably mounting on the bearings. The spindle nut assembly includes a nut that threads onto an outboard end of the axle spindle, and is tightened against the outboard bearing to a selected torque level. The nut includes an outboard surface that is formed with a plurality of features. A washer is formed with a tab that engages a keyway of the axle spindle outboardly of the nut, and with a plurality of mating features that mechanically engage the features formed in the outboard surface of the nut to prevent substantial rotation of the nut after the nut has been tightened to the selected torque level.

19 Claims, 20 Drawing Sheets

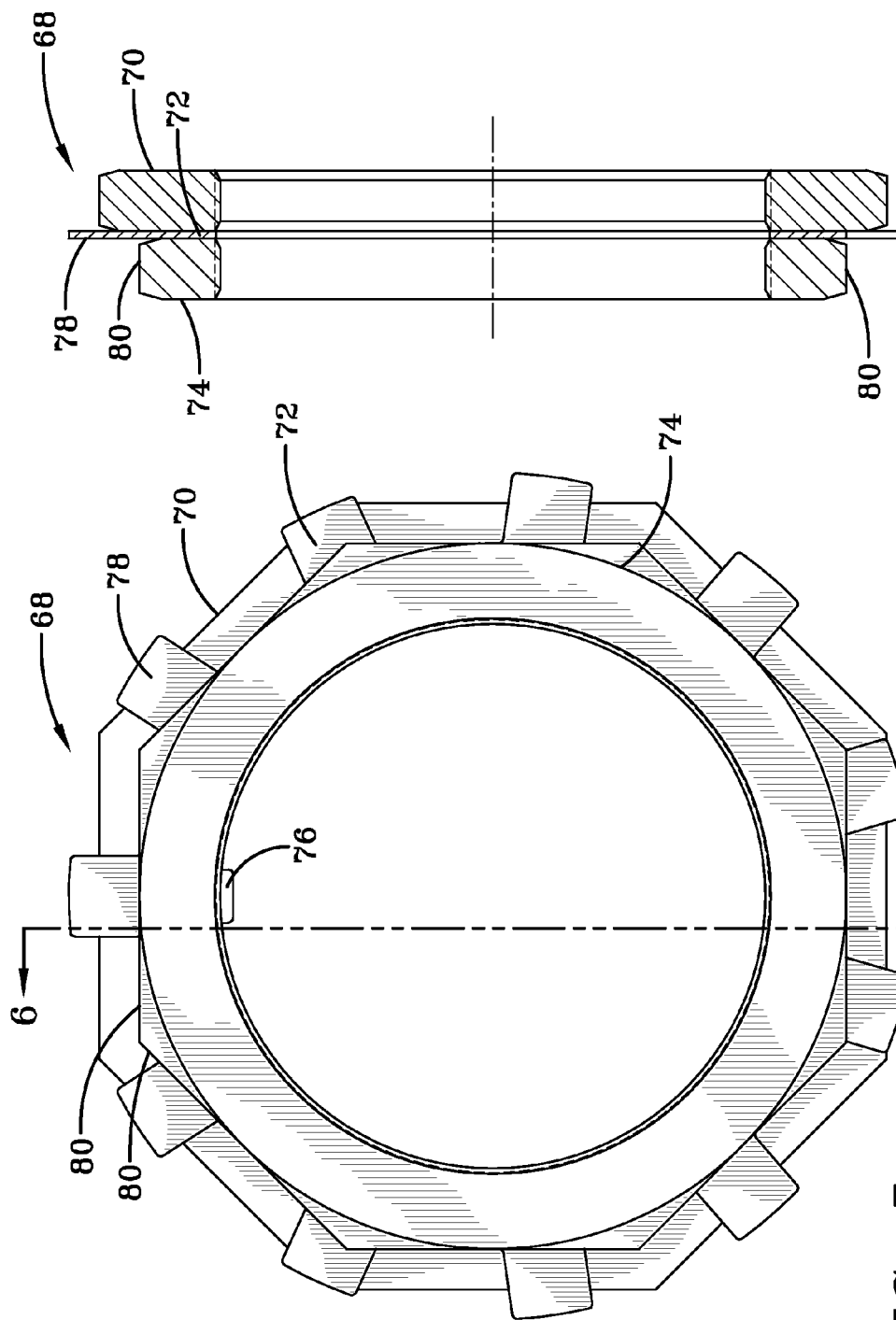

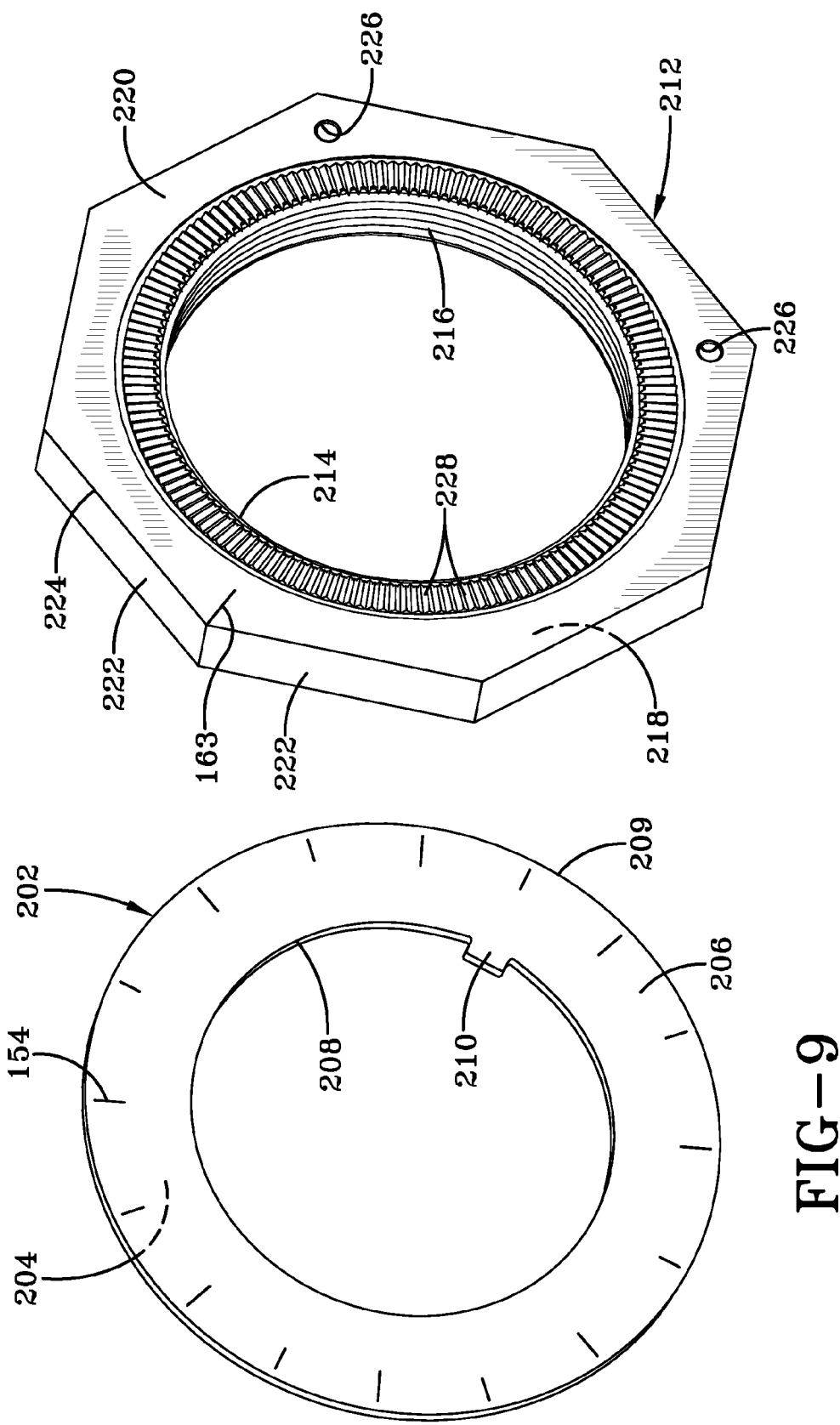

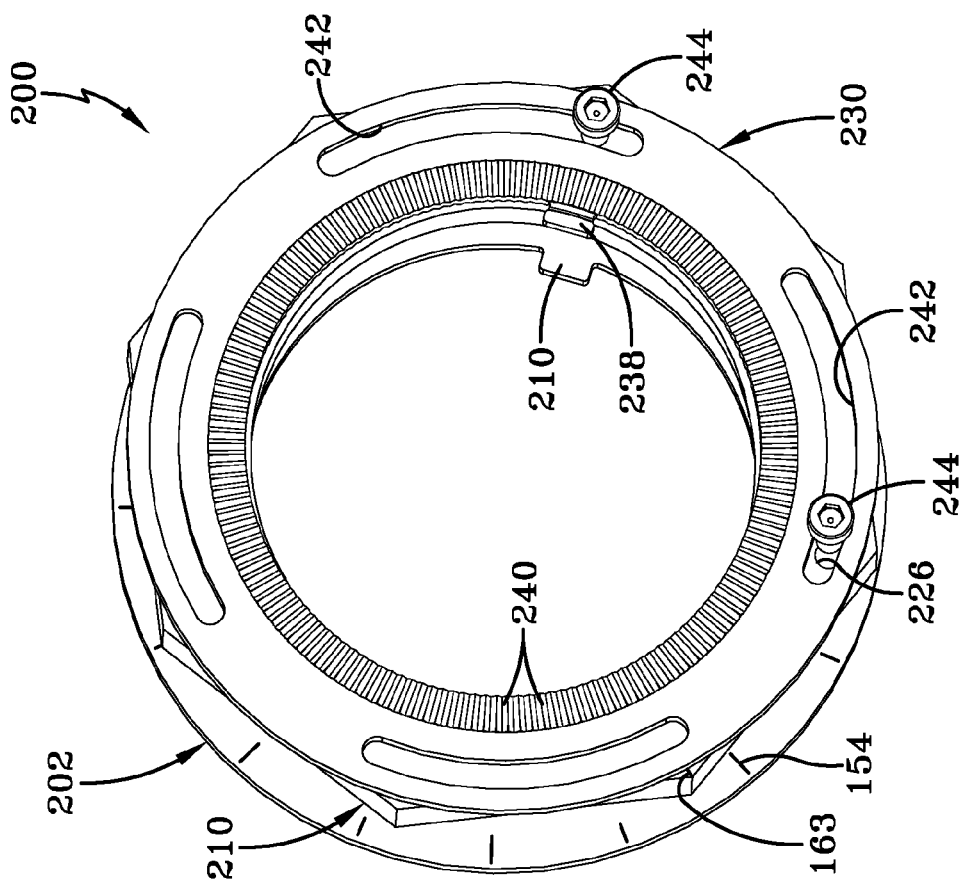
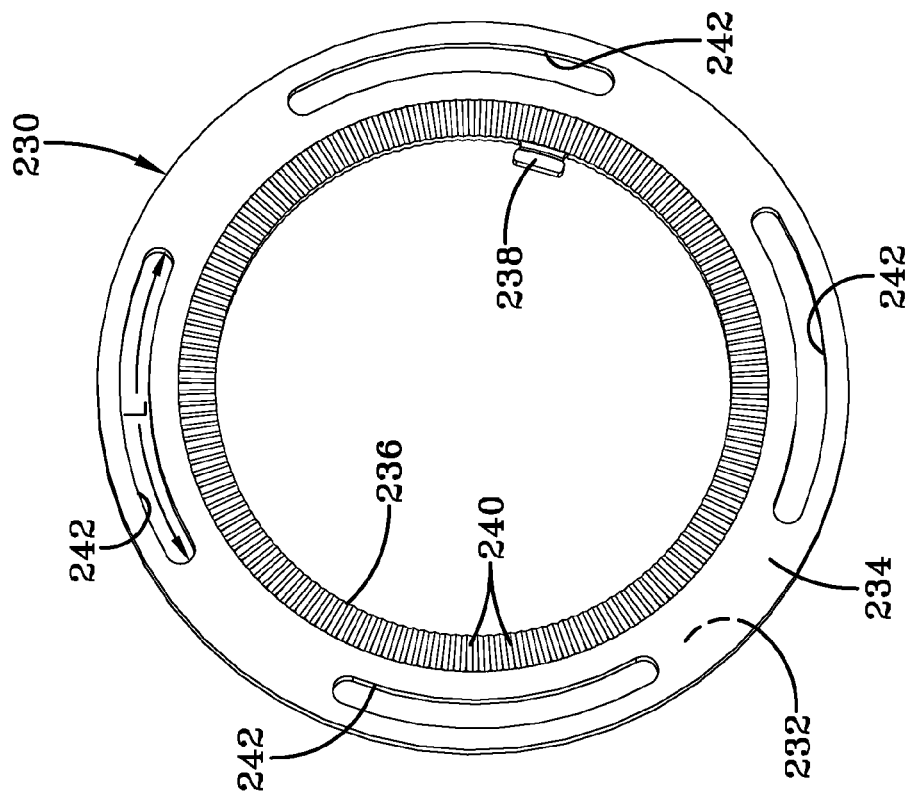

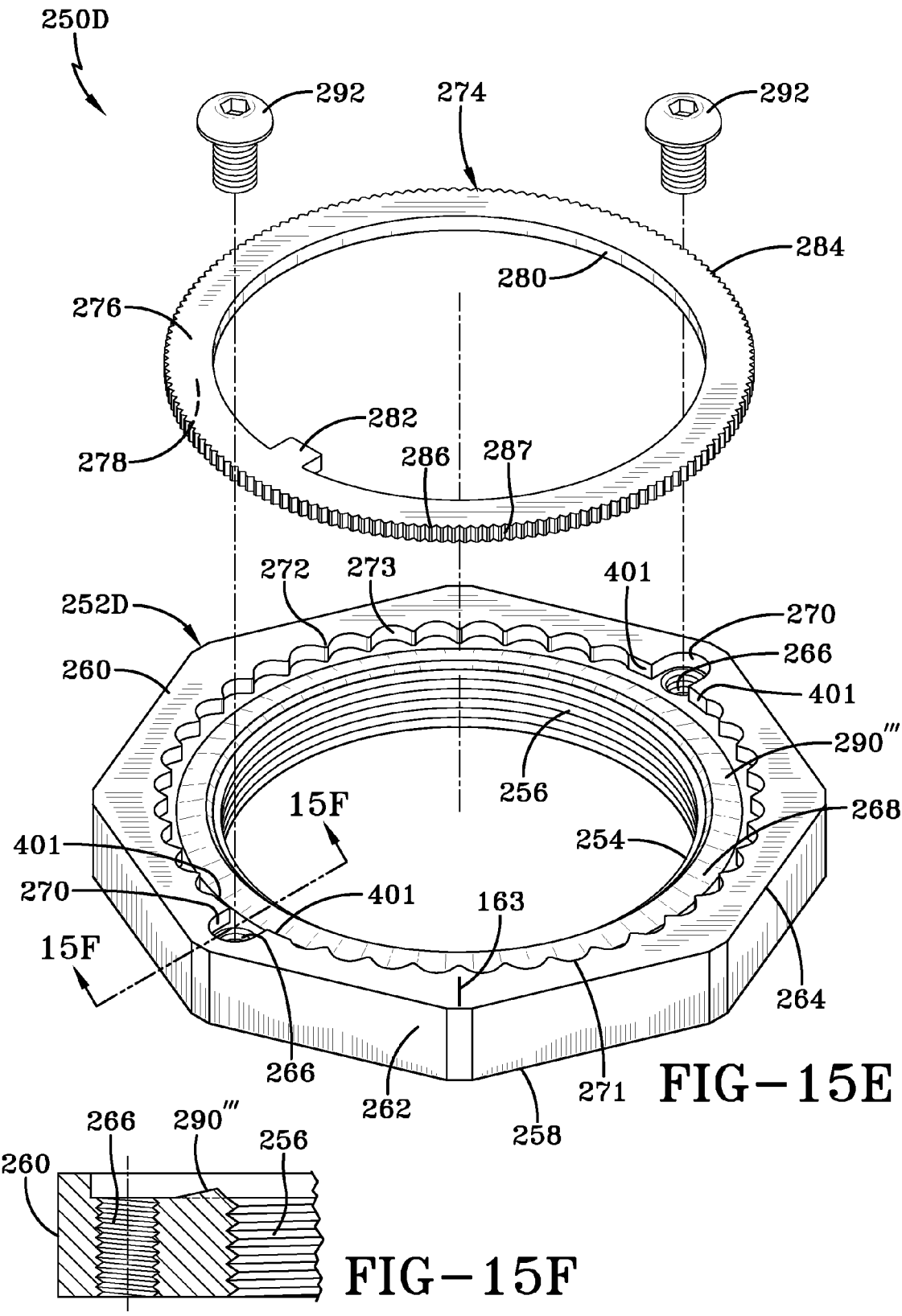

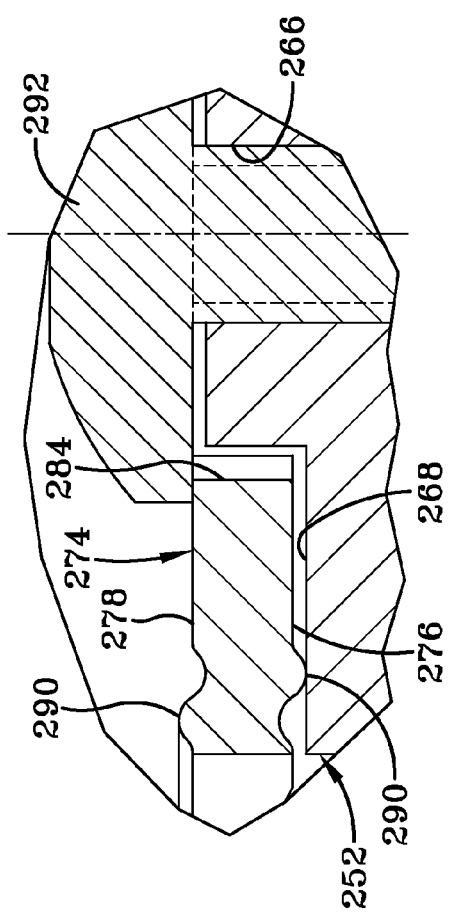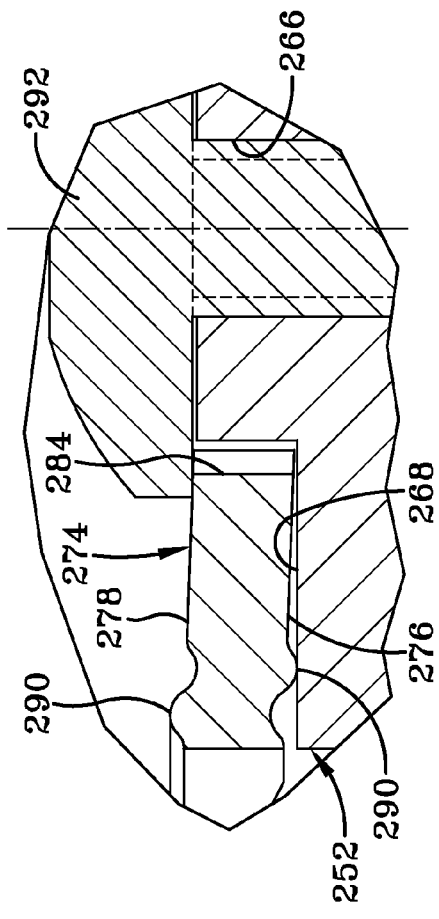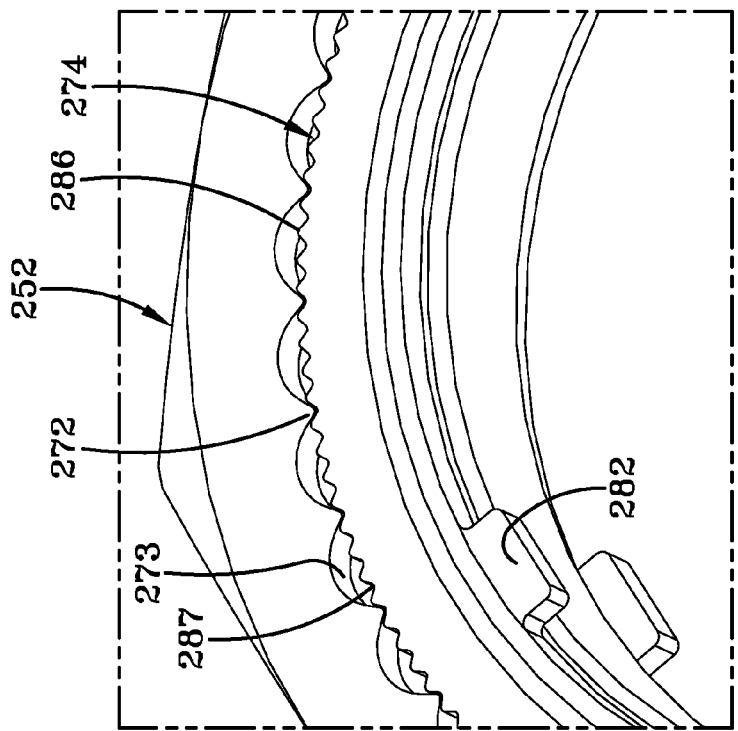

AXLE SPINDLE NUT ASSEMBLY FOR HEAVY-DUTY VEHICLES

CROSS-REFERENCE TO RELATED APPLICATIONS

This application is a continuation-in-part of U.S. Non-Provisional Patent Application Ser. No. 11/494,438, filed Jul. 27, 2006, which claims the benefit of U.S. Provisional Patent Application Ser. No. 60/713,889, filed on Sep. 2, 2005, and U.S. Provisional Patent Application Ser. No. 60/772,077, filed on Feb. 10, 2006.

BACKGROUND OF THE INVENTION

1. Technical Field

The invention relates to wheel end assemblies and in particular to wheel end assemblies for heavy-duty vehicles, such as tractor-trailers. More particularly, the invention is directed to an axle spindle nut assembly of a wheel end assembly for a heavy-duty vehicle, which includes a nut and a washer each formed with a sufficient number of interlocking features that secure components of the wheel end assembly on an axle spindle, such that during assembly, the possibility of over or under tightening the nut is minimized or eliminated.

2. Background Art

For many years, the heavy-duty vehicle industry has utilized wheel end assemblies which typically are mounted on each end of one or more non-drive axles. Each wheel end assembly typically includes a hub rotatably mounted on a bearing assembly that in turn is immovably mounted on the outboard end of the axle, commonly known as an axle spindle. The bearing assembly includes an inboard bearing and an outboard bearing, which often are separated by a bearing spacer. An axle spindle nut assembly secures the bearing assembly on the axle spindle, by engaging threads that are cut into the outer diameter of the outboard end of the axle spindle. In addition to retaining the position of the bearings and the spacer, the axle spindle nut assembly is used to provide the proper clamp force to compress the bearings, and any bearing spacer, to a predetermined amount.

As is well known to those skilled in the art, for normal operation of the wheel end assembly to occur, the bearing assembly and surrounding components must be lubricated with grease or oil. Therefore, the wheel end assembly also must be sealed to prevent leakage of the lubricant, and also to prevent contaminants from entering the assembly, both of which could be detrimental to its performance. More specifically, a hubcap is mounted on an outboard end of the wheel hub adjacent to and outboard from the axle spindle nut assembly, and a main seal is rotatably mounted on an inboard end of the hub and the bearing assembly in abutment with the axle spindle, resulting in a closed or sealed wheel end assembly.

While most wheel end assemblies include these general features, the design and arrangement of the hub, bearing assembly, bearing spacer, axle spindle nut assembly, hubcap, main seal, and other components, as well as the axle spindle, vary according to the specific vehicle design and its anticipated uses. For example, many prior art wheel end assemblies include an axle spindle nut assembly that includes multiple nuts and a lock washer. Such an assembly, while performing adequately in certain applications, can exhibit disadvantages associated with installation and maintenance of the proper clamp load.

More particularly, as mentioned above, the axle spindle nut assembly is used to provide the proper clamp force to compress the cones of the bearings and any bearing spacer to a predetermined amount. This is commonly referred to in the art as preloading the bearing cone and spacer group. For the purposes of convenience and clarity, reference herein shall be made to preloading of the bearing cone and spacer group with the understanding that such reference includes applications which utilize a bearing spacer, and applications which do not utilize a bearing spacer. Proper preloading of the bearing cone and spacer group helps to optimize the life of the bearings by controlling the tolerance range of the end play of the bearings. For example, if the clamp force on the bearing cone and spacer group is too low, there may be excessive end play of the bearings, which in turn creates excessive axial end play of the wheel end assembly relative to the axle spindle. Such excessive end play may allow undesirable movement of the main seal, which in turn potentially reduces the life of the main seal and the bearings. If the clamp force on the bearing cone and spacer group is too high, the bearings may effectively be over-compressed, interfering with their rotation and causing them to possibly wear out prematurely.

Axle spindle nut assemblies of the prior art include distinct disadvantages associated with proper installation of the nut assembly to provide the desired clamp force on the bearing cone and spacer group. For example, in the prior art, an axle spindle nut assembly with multiple nuts has been used to secure a wheel end assembly having standard heavy-duty vehicle stock inboard and outboard bearings and no bearing spacer. However, in these applications, proper installation of the axle spindle nut assembly on the wheel end assembly includes a complex procedure in which an inner nut of the axle spindle nut assembly is installed and torqued to a predetermined force level, and then a lock washer and an outer nut are installed and the outer nut is torqued to another predetermined level. Such a procedure is necessary to achieve an acceptable level of axial end play of the wheel end assembly relative to the axle spindle, such as about 5 thousandths of an inch. Because of manufacturing variances in thread form and the associated variation in thread lash between each of the nuts and the threads on the outboard end of the axle spindle, the procedure can often become quite complex. For example, the procedure typically involves torquing of the inner nut to a certain force level while the wheel hub is rotated, backing the inner nut off a certain distance, then re-torquing the inner nut while the wheel hub is again rotated, backing the inner nut off again, then installing the lock washer and torque the outer nut properly. Such a complex procedure undesirably increases the time and skill level involved to assemble the wheel end assembly, both during initial manufacturing and during maintenance-related servicing, which in turn increases the possibility of human error.

The use of multiple-nut axle spindle nut assemblies of the prior art to secure other types of wheel end assemblies, such as a wheel end assembly having standard heavy-duty vehicle stock inboard and outboard bearings and a bearing spacer, involve an installation procedure that typically is less complex than that described above for wheel end assemblies that do not include a bearing spacer, which is typically why a bearing spacer is employed. However, the use of a bearing spacer to simplify the procedure for installation of the axle spindle nut assembly undesirably increases the weight and cost of the wheel end assembly. In addition, to achieve an acceptable level of axial end play of the wheel end assembly relative to the axle spindle, the axle spindle nut assembly must undesirably be torqued to a high level when a bearing spacer is employed.

The use of multiple-nut axle spindle nut assemblies of the prior art to secure still other types of wheel end assemblies may create different disadvantages. More particularly, some wheel end assemblies include specialized, tight-tolerance unitized inboard and outboard bearings, which may reduce the need for a complex installation procedure for the axle spindle nut assembly, but still may require undesirably high torque on the axle spindle nut assembly to achieve an acceptable level of axial compression of the unitized bearing cone clamp group to obtain the desired bearing adjustment of the wheel end assembly. The use of unitized bearings also significantly increases the cost associated with the wheel end assembly and is therefore undesirable.

Furthermore, the use of the multiple-nut axle spindle nut assemblies of the prior art to secure any type of wheel end assembly increases the possibility of human error, such as, for example, one or more of the nuts in the axle spindle nut assembly being inadvertently torqued to an undesirable level, thereby undesirably over or under compressing the bearing cone and spacer group. For example, in certain prior art multiple nut and lock washer assemblies, the amount of torque on the inner nut is critical to proper compression of the bearing cone and spacer group, since the inner nut contacts the outboard bearing cone. However, since the outer nut is torqued after the inner nut has been torqued, over-torquing of the outer nut may cause the inner nut to loosen even if the inner nut has been properly torqued. More particularly, over-torquing of the outer nut may create excessive inboardly-directed pressure on the outboard face of the inner nut, which in turn causes the outboard thread faces of the inner nut to move inboardly, and thus away from the mating inboard thread faces on the axle spindle. Since engagement of these mating thread faces is necessary for the inner nut to securely maintain its position on the axle spindle, such separation of the thread faces can cause the inner nut to loosen, thereby under-compressing the bearing cone and spacer group.

Prior art axle spindle nut assemblies also lack means to indicate when the proper clamp load has been achieved, which is a disadvantage in some applications, such as when a relatively high level of torque on the spindle nut assembly is required. More particularly, many service shops have torque wrenches that can torque a spindle nut to a maximum level about 250 foot-pounds. When a wheel end assembly which requires that the axle spindle nut assembly be torqued above this level is being serviced, a technician typically may use the torque wrench to first torque the spindle nut assembly to 250 foot-pounds. Then, the technician typically will continue to tighten the spindle nut assembly, estimating the amount of torque being imposed on the axle spindle nut assembly, and may thus torque the nut assembly to an improper level.

Alternatively, to reach such a high torque level, the technician may use a torque multiplier to tighten the axle spindle nut assembly. A torque multiplier is a device known to those skilled in the art, and generally is accepted as being an unreliable method of developing the correct amount of torque on the nut, thereby potentially causing the technician to torque the axle spindle nut to an improper level. As described above, if the torque level is too low, the bearing cone and spacer group may undesirably be under compressed, and if the torque level is too high, the bearing cone and spacer group may undesirably be over compressed.

These disadvantages of prior art axle spindle nut assemblies make it desirable to develop an economical axle spindle nut assembly that is easy to install and remove, minimizes or eliminates the possibility of an installer over or under-torquing the nut assembly, indicates when the proper position of the nut of the spindle nut assembly has been attained, and can reduce the amount of torque required to preload the bearing cones. The present invention satisfies these needs, as will be described below.

SUMMARY OF THE INVENTION

One objective of the present invention is to provide an axle spindle nut assembly that is economical, durable, and less complex to install and remove than axle spindle nut assemblies of the prior art.

Another objective of the present invention is to provide an axle spindle nut assembly that minimizes or eliminates the possibility of an installer over or under-torquing the nut assembly.

Yet another objective of the present invention is to provide an axle spindle nut assembly that can reduce the amount of torque required to preload the bearing cones.

Still another objective of the present invention is to provide an axle spindle nut assembly that indicates when the proper position of the nut has been attained.

These objectives and others are obtained by the axle spindle nut assembly for securing a wheel end assembly of a heavy-duty vehicle on an axle spindle of an axle. The axle spindle has an outboard end formed with a keyway and threads, and the wheel end assembly includes an outboard bearing and an inboard bearing immovably mounted on the axle spindle for rotatably mounting a wheel hub on the axle spindle. The axle spindle nut assembly includes a nut formed with threads for threadably engaging the axle spindle threads. The nut is capable of being tightened to a selected torque level against the outboard bearing, and has an outboard surface formed with a plurality of features. The nut features include a recess with radially inwardly extending teeth, and the recess communicates with a pair of spaced-apart slots. The recess is formed with relief areas free of the teeth adjacent to each one of the pair of slots. A washer is disposed outboard of the nut on the axle spindle. The washer is formed with a tab for engaging the keyway of the axle spindle to prevent rotation of the washer about the axle spindle. The washer also is formed with a plurality of mating features for mechanically engaging the radially inwardly extending teeth of the nut. The mating features of the washer include radially outwardly extending teeth formed on an outer periphery of the washer whereby substantial rotation of the nut is prevented. A selected one of the washer and the nut is formed with at least one generally circumferentially-extending nub. A pair of fasteners secures the washer to the nut by insertion of the fasteners into respective ones of the slots. The nub aids contact of the fasteners with the washer and the nut so that the washer thereby is secured to the nut and is removable by removal of the fasteners and application of inboard pressure against the washer at a selected one of the slot relief areas of the nut.

These objectives and others are also obtained by the axle spindle nut assembly for securing a wheel end assembly of a heavy-duty vehicle on an axle spindle of an axle of the present invention. The axle spindle has an outboard end formed with a keyway and threads, and the wheel end assembly includes an outboard bearing and an inboard bearing removably mounted on the axle spindle for rotatably mounting a wheel hub on the axle spindle. The axle spindle nut assembly includes a first washer formed with an inboard surface and an outboard surface. The first washer is disposed on the axle spindle with the inboard surface adjacent to the outboard bearing. A nut is formed with threads for threadably engaging the axle spindle threads, and the nut is capable of being tightened to a selected torque level against the outboard surface of the first washer. The nut has an outboard surface formed with a plurality of features. The nut features include a recess with radially inwardly extending teeth, and the recess communicates with a pair of spaced-apart slots. The recess is formed with relief areas free of the teeth adjacent to each one of the pair of slots. A second washer is disposed outboard of the nut on the axle spindle. The second washer is formed with a tab for engaging the keyway of the axle spindle to prevent rotation of the second washer about the axle spindle. The second washer also is formed with a plurality of mating features for mechanically engaging the radially inwardly extending teeth of the nut. The washer mating features include radially outwardly extending teeth formed on an outer periphery of the washer whereby substantial rotation of the nut is prevented. A selected one of the washer and the nut is formed with at least one generally circumferentially-extending nub. A pair of fasteners secure the second washer to the nut by insertion of the fasteners into respective ones of the slots. The nub aids contact by the fasteners with the second washer and the nut so that the second washer thereby is secured to the nut and is removable by removal of the fasteners and application of inboard pressure against the second washer at a selected one of the slot relief areas of the nut.

BRIEF DESCRIPTION OF THE DRAWINGS

The preferred embodiments of the present invention, illustrative of the best mode in which applicant has contemplated applying the principles, are set forth in the following description and are shown in the drawings, and are particularly and distinctly pointed out and set forth in the appended claims.

FIG. 5 is an enlarged elevational front view of the second prior art axle spindle nut assembly shown in FIG. 4;

FIG. 6 is a cross-sectional view of the second prior art axle spindle nut assembly shown in FIG. 5, taken along line 6-6;

FIG. 9 is a perspective view of an inner washer of the axle spindle nut assembly shown in FIG. 8;

FIG. 10 is a perspective view of a nut of the axle spindle nut assembly shown in FIG. 8;

FIG. 11 is a perspective view of an outer washer of the axle spindle nut assembly shown in FIG. 8;

FIG. 12 is an assembled perspective view of the axle spindle nut assembly shown in FIG. 8;

FIG. 15E is an exploded perspective view of a sixth embodiment of the axle spindle nut assembly which is similar to the assemblies shown in FIGS. 15B to 15D, but showing a circumferentially-extending nub or ramp having a generally triangular-shaped cross-section formed on the nut;

FIG. 15F is a section taken along lines 15F-15F of FIG. 15E;

FIG. 16 is a greatly enlarged perspective view of a portion of the axle spindle nut assembly shown in the boxed area of FIG. 14;

FIG. 17 is a greatly enlarged cross-sectional view of the axle spindle nut assembly of FIG. 14 taken along line A-A, shown with a screw untightened;

FIG. 18 is a view similar to FIG. 17, but with the screw tightened;

Similar numerals refer to similar parts throughout the drawings.

DESCRIPTION OF THE PREFERRED EMBODIMENTS

Figure 1A:
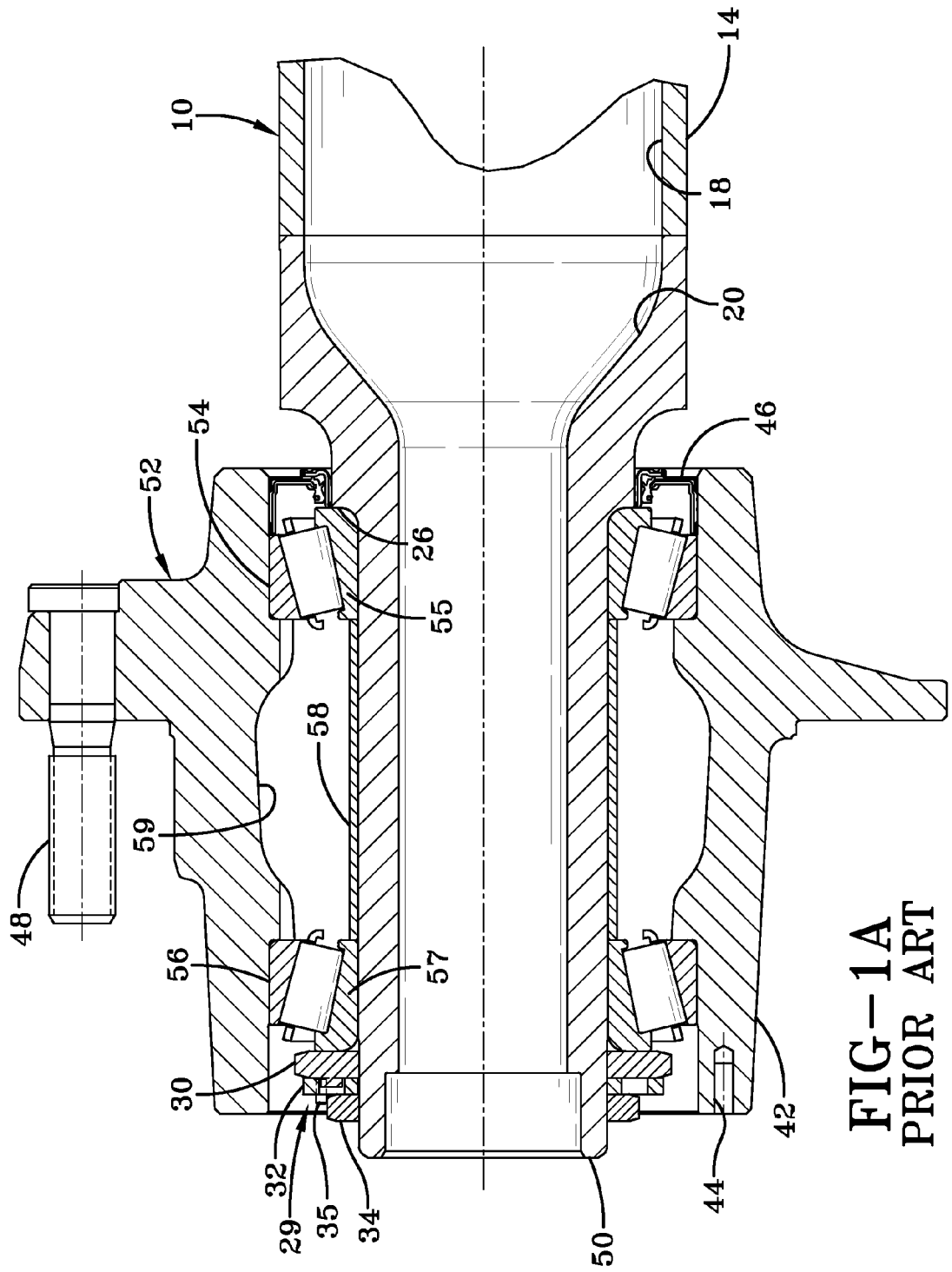
FIG. 1A is a fragmentary longitudinal cross-sectional view of a portion of a central tube of an axle, and a first axle spindle and wheel end assembly including a bearing spacer, incorporating a first prior art axle spindle nut assembly.
Figure 1B:
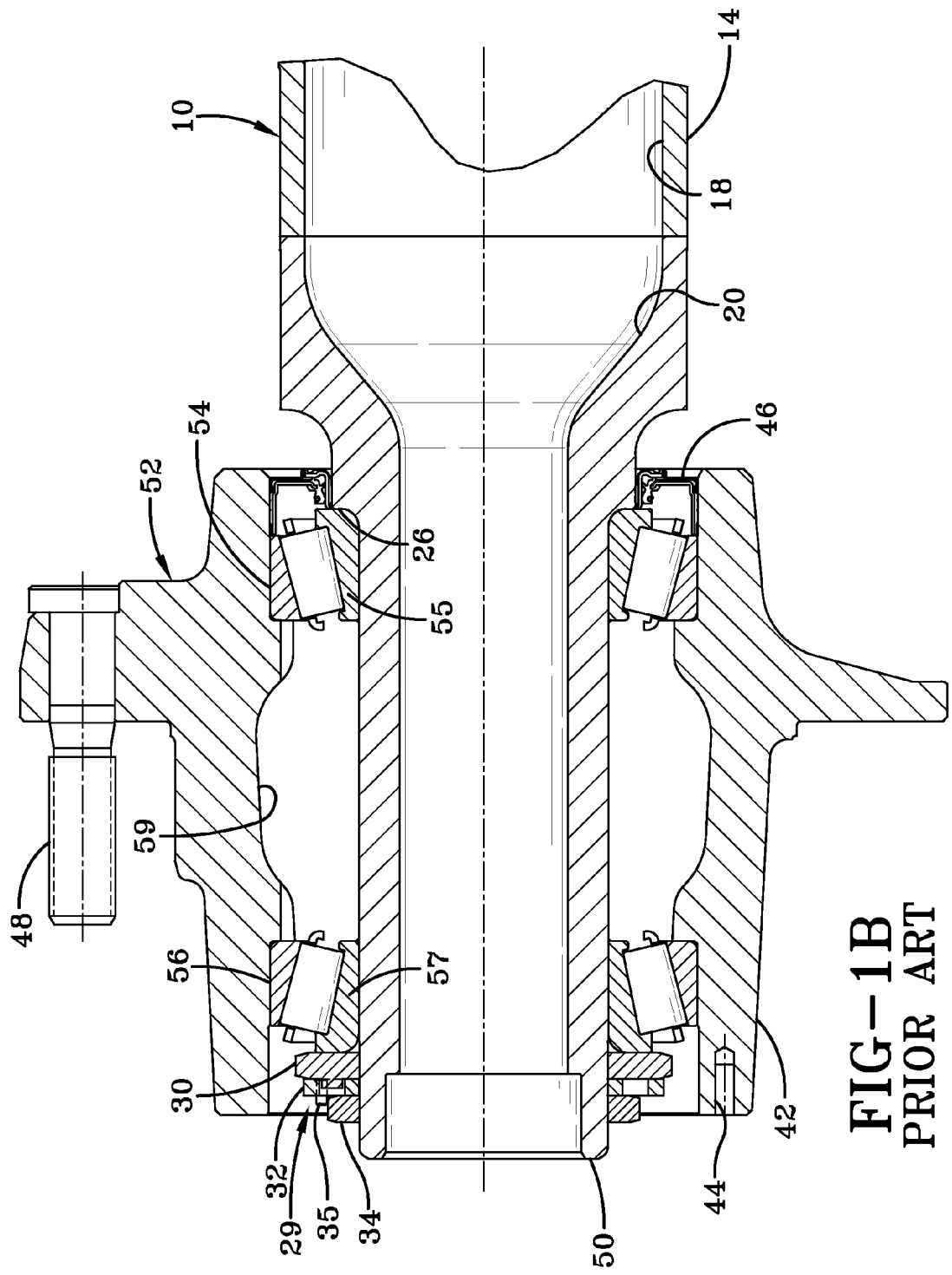
FIG. 1B is a view similar to that of FIG. 1A, but shown without a bearing spacer.

In order to better understand the axle spindle nut assembly of the present invention, a first axle spindle and wheel end assembly for a heavy-duty vehicle, using a first prior art axle spindle nut assembly, are shown in FIGS. 1A and 1B and now will be described. Axle 10 depends from and extends transversely across the trailer of a heavy-duty tractor-trailer (not shown). A typical heavy-duty tractor-trailer includes one or more non-drive axles 10 suspended from the trailer, with each of the axles having a first wheel end assembly 52 mounted on each end of the axle. Since each of the ends of axle 10 and its associated wheel end assembly 52 are generally identical, only one axle end and wheel end assembly 52 will be described herein. Axle 10 includes a central tube 14, and a first axle spindle 50 is integrally connected by any suitable means, such as welding, to each end of the central tube. Axle central tube 14 generally is tubular-shaped and is formed with an internal cavity 18. Axle spindle 50 is formed with a corresponding internal cavity 20.

Wheel end assembly 52 includes a bearing assembly having an inboard bearing 54 including its bearing cone 55, and an outboard bearing 56 including its bearing cone 57, each of which is immovably mounted on the outboard end of axle spindle 50. That is, inboard bearing 54 is mounted on the outer diameter of axle spindle 50 and has its inboard surface in abutment with a shoulder 26 formed in the axle spindle, and outboard bearing 56 is mounted on the axle spindle near the outboard end of the axle spindle. A cavity 59 is formed between inboard and outboard bearings 54, 56 and a bearing spacer 58 (FIG. 1A) optionally is disposed between the bearings in the cavity to conveniently maintain proper spacing between the bearings. Bearing cone 55 of inboard bearing 54, bearing cone 57 of outboard bearing 56, and bearing spacer 58 make up a bearing cone and spacer group. A first prior art axle spindle nut assembly 29, which includes an inboard nut 30, a lock washer 32, an outboard nut 34, and a set screw 35, threadably engages the outboard end of axle spindle 50 to secure bearing cones 55, 57 and bearing spacer 58 of the bearing cone and spacer group in place and to provide the proper clamp force to preload the bearing cone and spacer group.

Figures 2, 3:
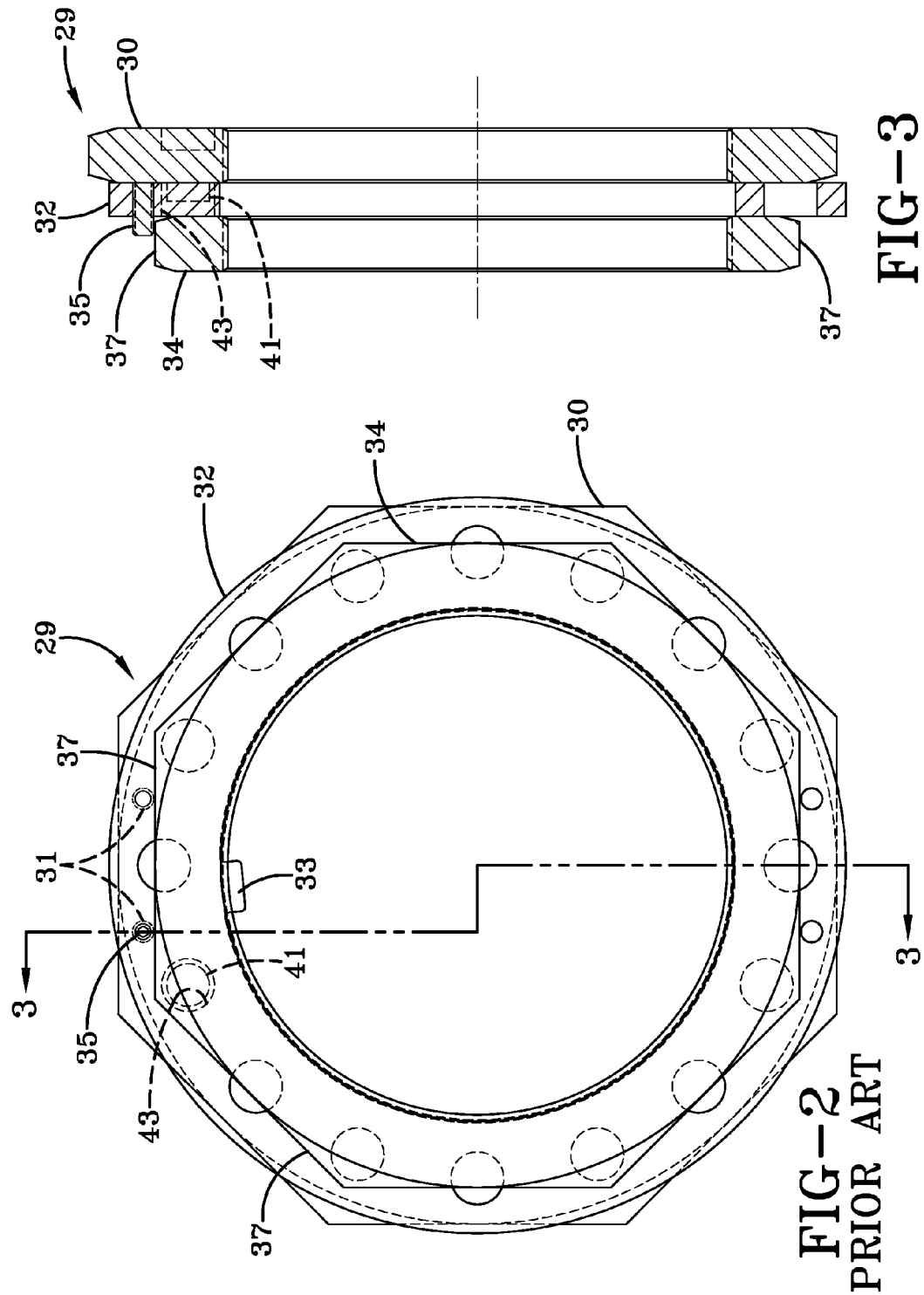
FIG. 2 is an enlarged elevational front view of the first prior art axle spindle nut assembly shown in FIG. 1 and depicting hidden structures with dashed lines.
FIG. 3 is a cross-sectional view of the first prior art axle spindle nut assembly shown in FIG. 2, taken along line 3-3.

More particularly, inboard nut 30 engages axle spindle 50 and abuts the outboard end of outboard bearing 56. With additional reference to FIGS. 2 and 3, lock washer 32 is disposed outboardly of inboard nut 30 and includes a tab 33 that engages a keyway (not shown) formed in axle spindle 50 to prevent rotation of the lock washer. A nub 41 that is punched in inboard nut 30 extends into a selected one of openings 43 formed in the lock washer to provide a coarse interlock to reduce unwanted rotation of the inboard nut. However, to install lock washer 32, inboard nut 30 typically must be undesirably rotated out of position in order to enable nub 41 to align with a selected one of openings 43. Lock washer 32 also includes a plurality of tapped openings 31, a selected one of which threadably receives set screw 35 once outboard nut 34 has been installed. Outboard nut 34 threadably engages axle spindle 50 and abuts lock washer 32. Openings 31 formed in lock washer 32 are radially proximate to wrench flats 37 formed on outboard nut 34, so that the installation of set screw 35 in a selected opening creates a positive stop against a corresponding outer flight of the outboard nut, thereby preventing the outboard nut from rotating enough to enable undesirable rotation of inboard nut 30.

Returning now to FIG. 1A, a wheel hub 42 is rotatably mounted on inboard and outboard bearings 54, 56 in a manner well known to those skilled in the art. A hubcap (not shown) is mounted on the outboard end of hub 42 by a plurality of bolts that each pass through a respective one of a plurality of openings formed in the hubcap, and threadably engage a respective one of a plurality of aligned threaded openings 44 formed in the hub. In this manner, the hubcap closes the outboard end of wheel end assembly 52. A main continuous seal 46 is rotatably mounted on the inboard end of wheel end assembly 52 and closes the inboard end of the assembly. More particularly, seal 46 is mounted on wheel end assembly 52 in a suitable manner and radially bridges hub 42 and axle spindle 50 to seal cavity 59. In order to maintain proper lubrication and operation of inboard and outboard bearings 54, 56, a suitable amount of lubricant (not shown) is introduced into cavity 59. A plurality of interference-fit studs 48 (only one shown) are used to mount a brake drum, tire rim and tire (not shown) on wheel end assembly 52.

As described above, inboard nut 30 threadably engages axle spindle 50 and is tightened against outboard bearing 56, which provides part of the clamping force to preload bearing cones 55, 57 and bearing spacer 58 of the bearing cone and spacer group. When bearing spacer 58 is included in wheel end assembly 52, as shown in FIG. 1A, the preloading process typically involves a complex procedure. For example, the procedure usually includes torquing inboard nut 30 to a level of several hundred foot-pounds, such as about 315 foot-pounds, then installing lock washer 32, which may involve undesirable rotation of the inboard nut to align the coarse locking feature, then torquing outboard nut 34 to a lower level, such as about 225 foot pounds, and installing set screw 35 in a selected one of openings 31 to prevent the outboard nut from rotating enough to enable further undesirable rotation of inboard nut 30.

This process becomes considerably more complex when bearing spacer 58 is not present, as shown in FIG. 1B, as inboard nut 30 then typically is torqued to a lower level while hub 42 is rotated, the inboard nut is backed off a certain distance and re-torqued to another level while the hub is again rotated, the inboard nut is then backed off again, lock washer 32 is installed, outboard nut 34 is installed and torqued to a level of several hundred foot-pounds, the end play of the hub is checked, and then set screw 35 is installed in a selected one of openings 31.

Figure 4:
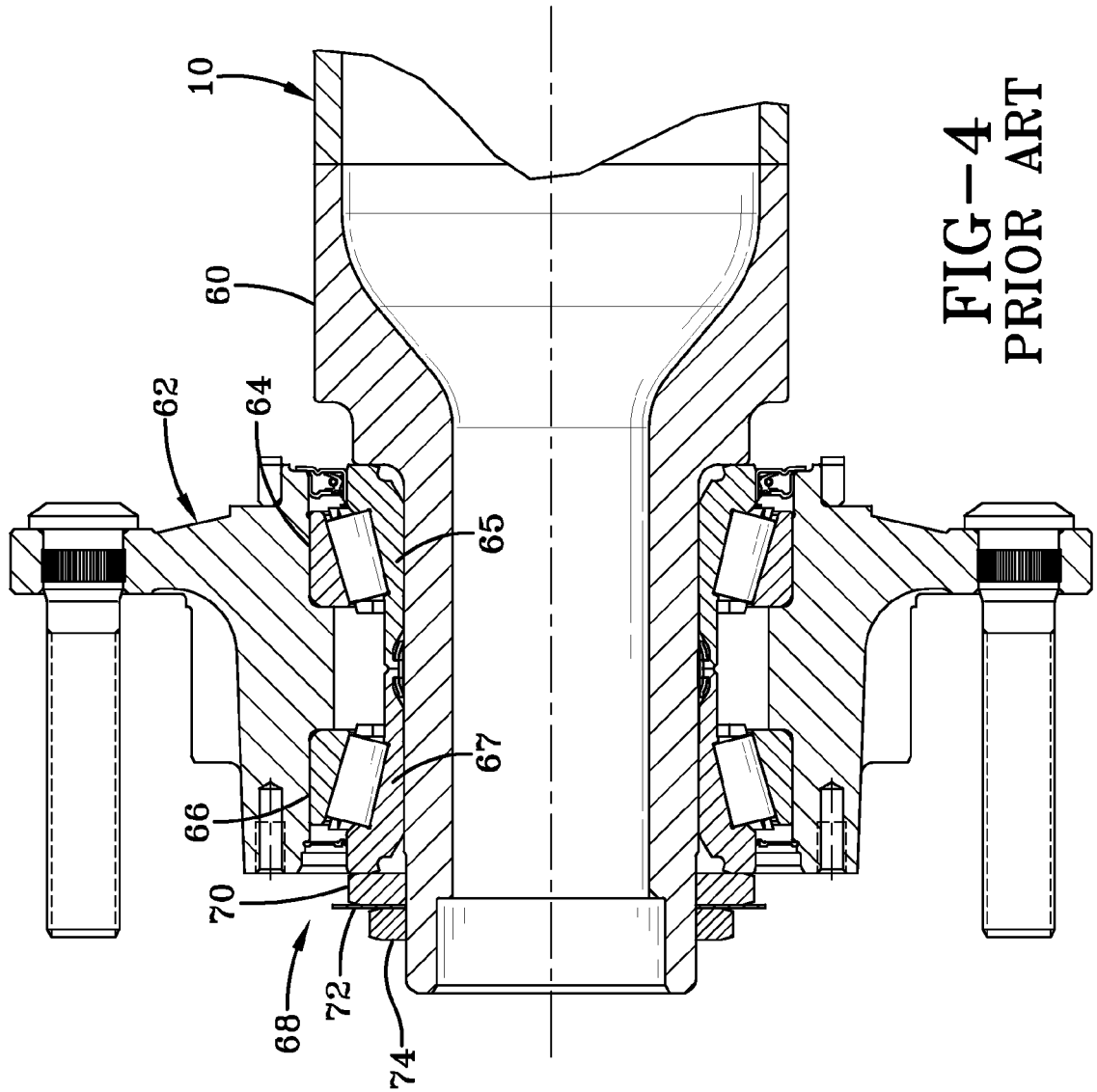
FIG. 4 is a fragmentary longitudinal cross-sectional view of a portion of a central tube of an axle, and a second axle spindle and wheel end assembly, incorporating a second prior art axle spindle nut assembly.

For additional reference, a second axle spindle 60 and wheel end assembly 62 for a heavy duty vehicle, using a second prior art axle spindle nut assembly 68, are shown in FIG. 4. Second wheel end assembly 62 includes an inboard bearing 64 including its bearing cone 65, and an outboard bearing 66 including its bearing cone 67, mounted on the outboard end of second axle spindle 60. Since second axle spindle end 60 and wheel end assembly 62 do not include a bearing spacer, the bearing cone and spacer group is actually a bearing cone group, including bearing cone 65 of inboard bearing 64 and bearing cone 67 of outboard bearing 66. Second prior art axle spindle nut assembly 68 includes an inboard nut 70, a lock washer 72, and an outboard nut 74, and threadably engages the outboard end of axle spindle 60 to secure bearings 64, 66 in place and provide the proper clamp force to preload the bearing cones 65, 67 of the bearing cone group.

More particularly, inboard nut 70 threadably engages axle spindle 60 and abuts the outboard end of outboard bearing 66. With additional reference to FIGS. 5 and 6, lock washer 72 is disposed outboardly of inboard nut 70 and includes an inner tab 76 that engages a keyway (not shown) formed in axle spindle 60 to prevent rotation of the lock washer. Lock washer 72 also includes a plurality of outer tabs 78 that are bent to engage outer flats 80 of outboard nut 74 once the outboard nut has been installed, thereby preventing excessive rotation of the outboard nut. In order to enable outer tabs 78 to be bent, lock washer 72 typically must be relatively thin and soft, which undesirably limits the strength of inner tab 76 for engagement with the axle spindle keyway.

The installation procedure for second prior art axle spindle nut assembly 68 and the preloading procedure for bearing cones 65, 67 of the bearing cone group is substantially the same as described above for first prior art axle spindle nut assembly 29 when the first prior art assembly includes bearing spacer 58, with the exception that the torque level for inboard nut 70 may be even higher than that for first prior art inboard nut 30, such as about 725 foot-pounds, to obtain the required clamp load.

The complex installation procedures associated with prior art axle spindle nut assemblies 29, 68 may lead to improper or incomplete performance of the procedures, such as the omission of a part, under-torquing of the axle spindle nut assembly, which may cause excessive end play of the wheel end assembly and potentially reduce the life of main seal 46 and bearings 54, 56, 64, 66, or over-torquing of the axle spindle nut assembly, which may over-compress the bearings and reduce their fatigue life. Also, the lack of means on prior art spindle nut assemblies 29, 68 to indicate when the proper position of the nut has been achieved may also result in undesirable under or over-clamping of the bearing cone and spacer group. In addition, the multiple-nut construction of first prior art axle spindle nut assembly 29 may create the need to torque inboard nut 30 to an undesirably high level to preload the bearing cone and spacer group. Moreover, the multiple-nut construction of second prior art axle spindle nut assembly 68 may potentially allow inboard nut 70 to undesirably loosen after outboard nut 74 is over-tightened.

These disadvantages of prior art axle spindle nut assemblies 29, 68 make it desirable to develop an axle spindle nut assembly that is economical, easy to install, minimizes the possibility of an installer over or under-torquing the spindle nut assembly, indicates when the proper position of the nut has been attained, and can reduce the amount of torque required to preload the bearing cone and spacer group. The present invention satisfies these needs, as now will be described.

Figure 7:
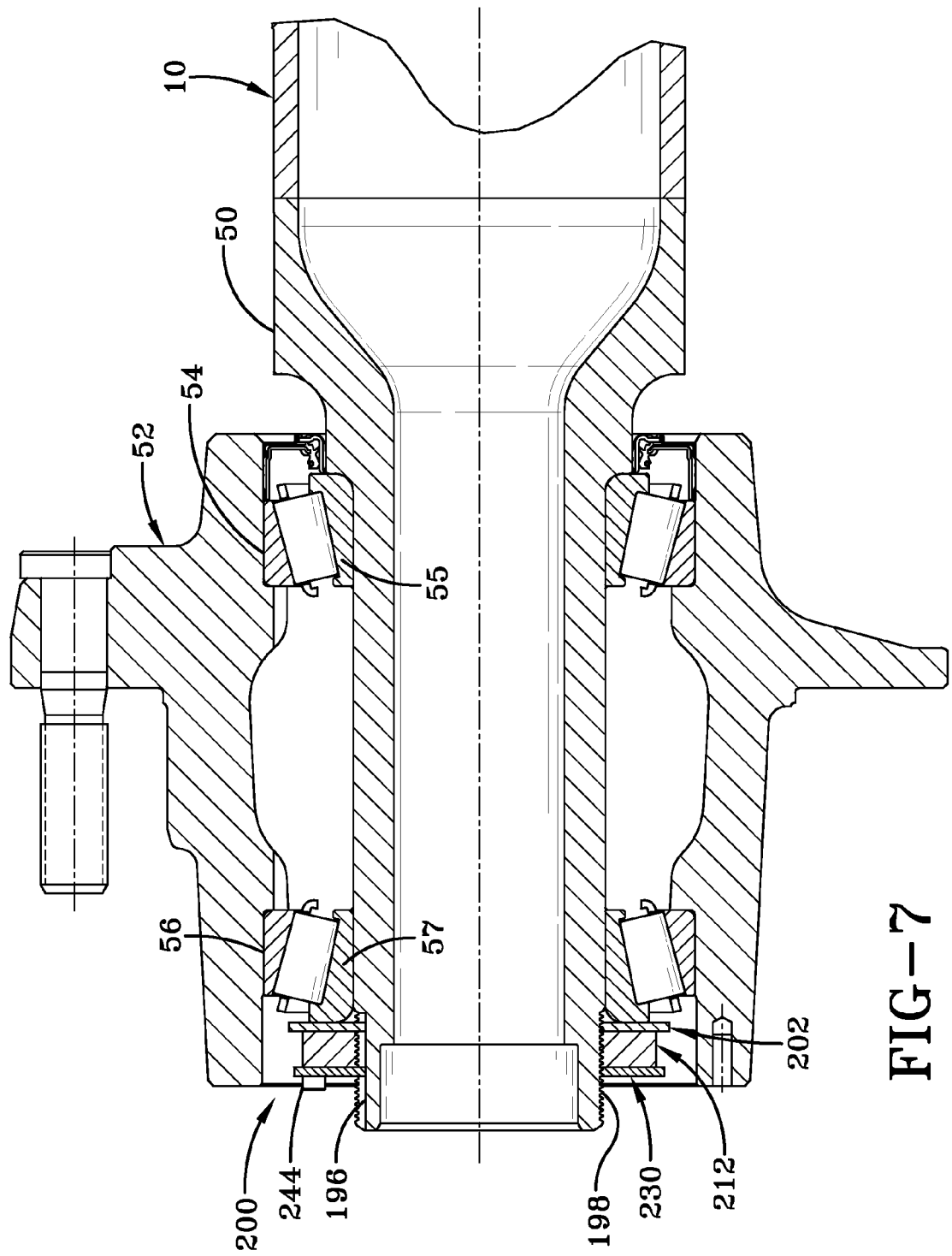
FIG. 7 is a fragmentary longitudinal cross-sectional view of a portion of a central tube of an axle, first axle spindle and wheel end assembly shown in FIG. 1A, but shown without a bearing spacer, and incorporating a first embodiment axle spindle nut assembly of the present invention.

Turning now to FIG. 7, a first embodiment axle spindle nut assembly of the present invention is indicated generally at 200 and is shown incorporated into first axle spindle 50 and wheel end assembly 52, with the exception that bearing spacer 58 (FIG. 1) preferably is not included, as will be described in greater detail below. Axle spindle nut assembly 200 includes an optional inner washer 202, an axle spindle nut 212, an outer washer 230, and at least one screw 244. Axle spindle nut 212, washers 202, 230 and screw 244 cooperate to secure bearings 54, 56 of wheel end assembly 52 in place, and to preload bearing cones 55, 57.

Figure 8:
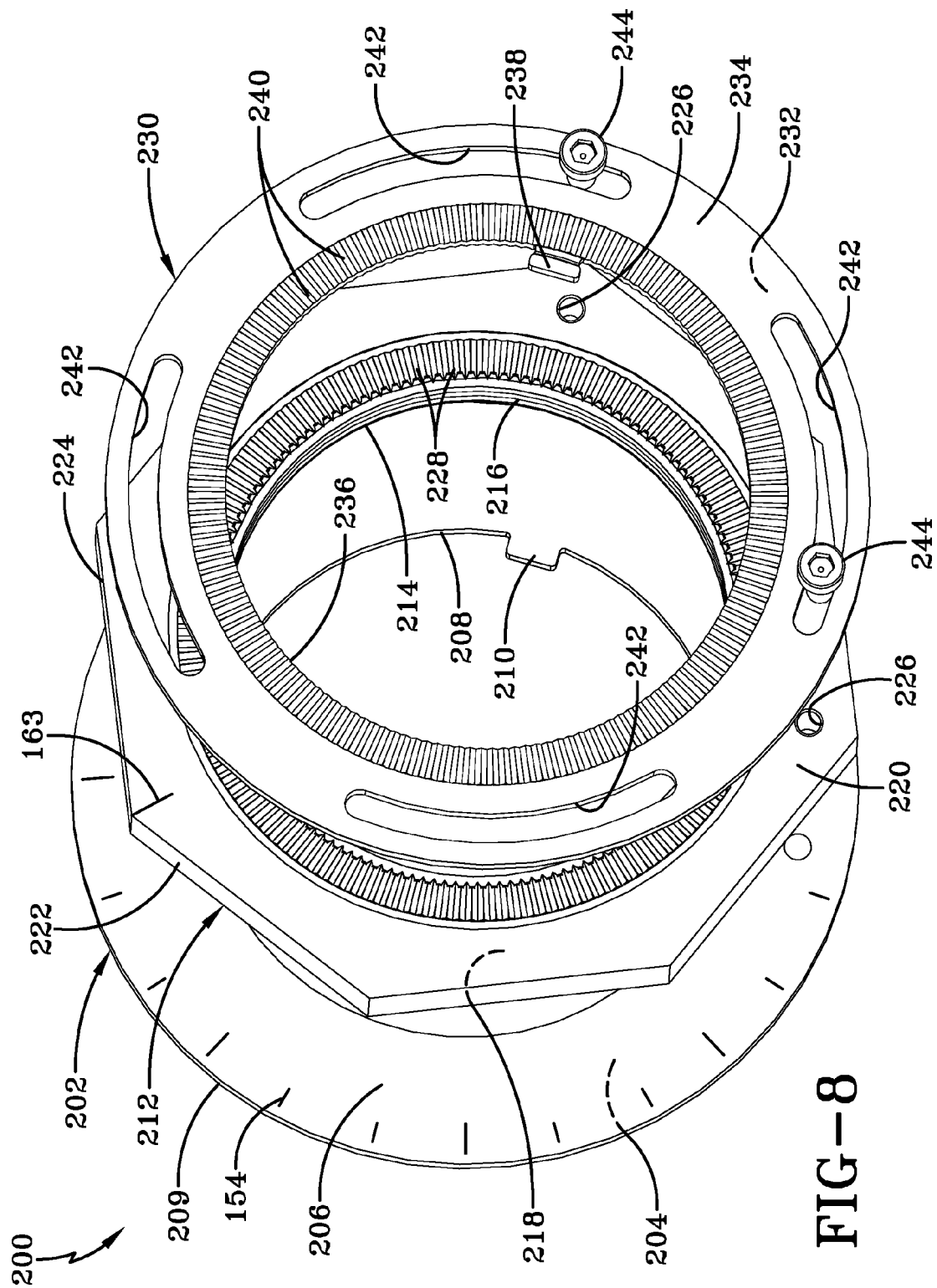
FIG. 8 is an enlarged exploded outboard perspective view of the first embodiment axle spindle nut assembly of the present invention.

More particularly, with additional reference to FIGS. 8 and 9, optional inner washer 202 is a flat washer having an inboard face 204 that is proximate to and contacts outboard bearing cone 57 of wheel end assembly 52 in an assembled state. Inner washer 202 also includes an outboard face 206, which is proximate to and contacts nut 212 in an assembled state. An inner periphery 208 of washer 202 is formed with a tab 210, which engages a keyway 196 (FIG. 7) formed in axle spindle 50. The engagement of tab 210 in keyway 196 prevents inner washer 202 from rotating, which in turn may prevent or reduce the occurrence of back-off torque or drag in bearings 54, 56, which could undesirably cause nut 212 to loosen. Thus, inner washer 202, while optional, may find use in certain applications.

Referring now to FIGS. 8 and 10, nut 212 includes threads 216 formed along an inner periphery 214 of the nut, which engage threads 198 (FIG. 7) formed on the outer periphery of the outboard end of axle spindle 50. Nut 212 thus is threaded onto the outboard end of axle spindle 50 until an inboard face 218 of the nut contacts inner washer outboard face 206 when the inner washer is used. If inner washer 202 is not used, inboard face 218 of nut 212 directly contacts outboard bearing cone 57 of wheel end assembly 52 in an assembled state. Nut 212 also includes an outboard face 220, which is proximate to and contacts outer washer 230 in an assembled state, as will be described in greater detail below. Wrench flats 222 are formed on an outer periphery 224 of nut 212, which facilitate installation and removal of the nut. Once nut 212 is in contact with inner washer 202 or outboard bearing cone 57, a specified torquing and hub spinning methodology, as known to those skilled in the art, is used to seat the rollers of bearings 54, 56.

Once the rollers of bearings 54, 56 are seated using the above-described torquing and hub spinning methodology, nut 212 is tightened to a predetermined level using a torque wrench (not shown) or other means known in the art. For example, nut 212 preferably is tightened to a torque level that is less than 100 foot-pounds, which is typically considered to be a light bearing preload application, thereby creating a minor preload on bearing cones 55, 57. This minor preload optimizes the life of bearings 54, 56 by reducing fatigue, as known in the heavy-duty vehicle bearing art.

With continuing reference to FIGS. 8 and 10, outboard face 220 of nut 212 is formed with threaded holes 226 for receiving screws 244, as will be described below. Nut outboard face 220 also is formed with a plurality of features 228, such as indentations, preferably along and adjacent to nut inner periphery 214, such as radially-extending spaced-apart grooves that are formed in a circular pattern proximate the inner periphery. The pattern and geometry of indentations 228 enable them to engage mating features that are formed on outer washer 230, as will be described below. For example, preferably one-hundred eighty (180) indentations 228 are formed as generally V-shaped grooves that extend about the entire inner periphery 214 of nut 212.

With reference now to FIGS. 8 and 11, outer washer 230 is formed with a tab 238 on an inner periphery 236, which engages axle spindle keyway 196 (FIG. 7) to prevent the outer washer from rotating. Outer washer 230 includes a first face 232 and a second face 234. Each face 232, 234 is formed with features 240, such as teeth, that correspond to mating grooves 228 formed on outboard face 220 of nut 212, so that when the outer washer is slid onto axle spindle 50 and abuts the nut, the inboardly-facing teeth engage the grooves in the nut. Teeth 240 preferably are formed so that the peak of each tooth on first face 232 is formed opposite a corresponding valley between the teeth on second face 234, which encourages material flow during a manufacturing process for outer washer 230, such as stamping, thereby making the outer washer economical to manufacture. Outer washer 230 also is formed with curved slots 242 that enable screws 244 to threadably engage holes 226 and secure the outer washer to nut 212. As will be described in greater detail below, slots 242 are formed to be nonsymmetrically aligned with respect to outer washer tab 238.

Turning now to FIGS. 7 and 12, once optional inner washer 202 has been positioned on axle spindle 50 against outboard bearing cone 57, nut 212 is installed and the rollers of bearings 54, 56 are seated using the torquing and hub spinning methodology. Nut 212 then is torqued to a predetermined amount, as described above, and outer washer 230 is placed on axle spindle 50. If screw holes 226 in nut 212 can be seen through respective ones of outer washer slots 242, screws 244, which preferably are cap screws, are installed and tightened. The tightening of cap screws 244 causes teeth 240 formed on the respective inboardly-directed one of first and second washer faces 232, 234 to engage and interlock with grooves 228 formed in the nut. The mechanical engagement of teeth 240 and grooves 228 secures nut 212 against outer washer 230, which is prevented from rotating by tab 238 engaged in keyway 196. In this manner, the positive mechanical engagement of teeth 240 with grooves 228 provides a lock that resists load forces which can act to unscrew nut 212 and create a possible loss of preload.

If screw holes 226 in nut 212 do not align with respective ones of outer washer slots 242, the nonsymmetrical alignment of the slots with respect to outer washer tab 238 finds particular application. More particularly, once nut 212 is torqued to the proper level, screw holes 226 may not align with outer washer slots 242, since the outer washer does not rotate about axle spindle 50 due to the engagement of outer washer tab 238 in axle spindle keyway 196, and each outer washer slot is of a limited length L (FIG. 11). Since nut 212 has been torqued to the proper level, it would be undesirable to rotate the nut to attempt to align screw holes 226 with outer washer slots 242. However, outer washer slots 242 are located in a generally uniform circular arrangement, and outer washer tab 238 is offset from the center of each slot, and therefore also is offset from the solid washer portions between the slots. Therefore, if nut 212 has been torqued to a position that does not allow screw holes 226 to be visible through outer washer slots 242, the outer washer is removed from axle spindle 50, flipped over and reinstalled, whereupon the offset of outer washer tab 238 enables the slots to align with the screw holes. For example, if outer washer 230 was installed so that first face 232 was proximate nut 212, but holes 226 could not been seen through slots 242, the outer washer is removed and turned over so that second face 234 is proximate the nut, which will result in the holes being seen through the slots, enabling installation of cap screws 244. In this manner, the offset between tab 238 of the outer washer and slots 242 provides 360 degrees of location coverage so that the interlock between the tab and keyway 196 is always possible without loosening or tightening nut 212 to gain final alignment.

Moreover, the presence of teeth 240 on both faces 232, 234 of outer washer 230 ensures operation of the locking feature between the outer washer and nut 212 to prevent rotation of the nut and subsequent loss of preload, regardless of which face abuts the nut. It is to be noted that each slot 242 has a limited length L (FIG. 11), which limits any potential rotation of nut 212 that might still occur relative to outer washer 230 once screws 244 are installed. More specifically, since outer washer 230 is secured against rotation by the engagement of tab 238 in axle spindle keyway 196, if nut 212 does begin to rotate, any rotation will be limited by the contact of a cap screw 244, which is engaged in a respective screw hole 226, with the end of a respective slot 242. Such rotation of nut 212 could occur in the event that cap screws 244 are engaged but not tight in screw holes 226, which could preclude firm engagement of outer washer teeth 240 in nut grooves 228. Thus, nut 212 is prevented from unscrewing off of axle spindle 50. Cap screws 244 optionally may include a thread locking compound on their threads, or an attached Belleville washer or flange head, to assist in their attachment.

It should be noted that the number of mating features 228, 240 formed on nut 212 and outer washer 230, respectively, also acts to prevent undesirable rotation of the nut during assembly. As mentioned above, with reference to FIGS. 7 and 8, it is undesirable for nut 212 to rotate during installation of axle spindle nut assembly 200 once it has been torqued to the proper level, since any such rotation would change the amount of torque on the nut and thus change the bearing preload.

More particularly, once nut 212 is torqued to the desired level, its position is set. When outer washer 230 is installed, tab 238 engages keyway 196 formed in axle spindle 50, which prevents rotation of the outer washer. If mating features 228, 240 formed on nut 212 and outer washer 230, respectively, are too small in number or too large in size, they may not interlock unless the nut is rotated, which is undesirable. By forming a large number of grooves 228 on nut 212, such as one-hundred eighty (180) grooves, and a corresponding number of teeth 240 on outer washer 230, the probability that the grooves and teeth will align is increased, thereby reducing the potential undesirable rotation of the nut. The probability of alignment is further increased by the offset of teeth 240 formed on first washer face 232 relative to the teeth formed on second washer face 234, since the peak of each tooth on the first face preferably is formed opposite a corresponding valley between the teeth on second face. Thus, outer washer 230 doubles the probability of alignment of teeth 240 with grooves 228 formed in nut 212.

It is to be noted that grooves or indentations 228 may be formed on outer washer 230 and corresponding teeth or features 240 may be formed on the nut, rather than the grooves being formed on the nut and the teeth being formed on the outer washer. In addition, any form, pattern and combination of interlocking grooves or indentations 228 and teeth or features 240 may be used without affecting the overall concept or operation of the invention. Moreover, other means to enable outer washer 230 to be secured against nut 212 if one or more screw holes 226 are not aligned with outer washer slots 242 may be used without affecting the overall concept or operation of the invention. For example, additional holes 226 may be formed in nut 212, so that at least any given pair of the screw holes aligns with respective ones of outer washer slots 242 without flipping the outer washer over or rotating the nut. In such a case, it may be desirable to form features 228 only on a designated inboardly-directed one of outboard washer faces 232, 234, rather than on both faces. Furthermore, fastening means other than screws 244 may be used to secure outer washer 230 and nut 212 without affecting the overall concept or operation of the invention, such as bolts, rivets, dowels, interlocking pins, and the like.

Returning now to FIG. 7, the use of single nut 212 enables the use of a desirably low torque level to preload bearing cones 55, 57. Moreover, the use of such a generally low torque level further optimizes the life of bearings 54, 56 by enabling nut 212 to be tightened to a point that minimizes or eliminates end play of wheel end assembly 52 relative to axle spindle end 50, keeping adjustment of such end play in a relatively narrow range, in contrast to prior art axle spindle nut assemblies 29, 68, which encouraged an installer to allow some end play due to the complex installation procedures and/or high torque levels required by those prior art assemblies. For example, using axle spindle nut assembly 200, the axial end play of wheel end assembly 52 relative to axle spindle 50 may be reduced from about 5 thousandths of an inch to about one thousandth of an inch, or zero, or even to fine amounts of preload without concern of adjustment resolution causing an undesirable excessive preload.

Figure 13:
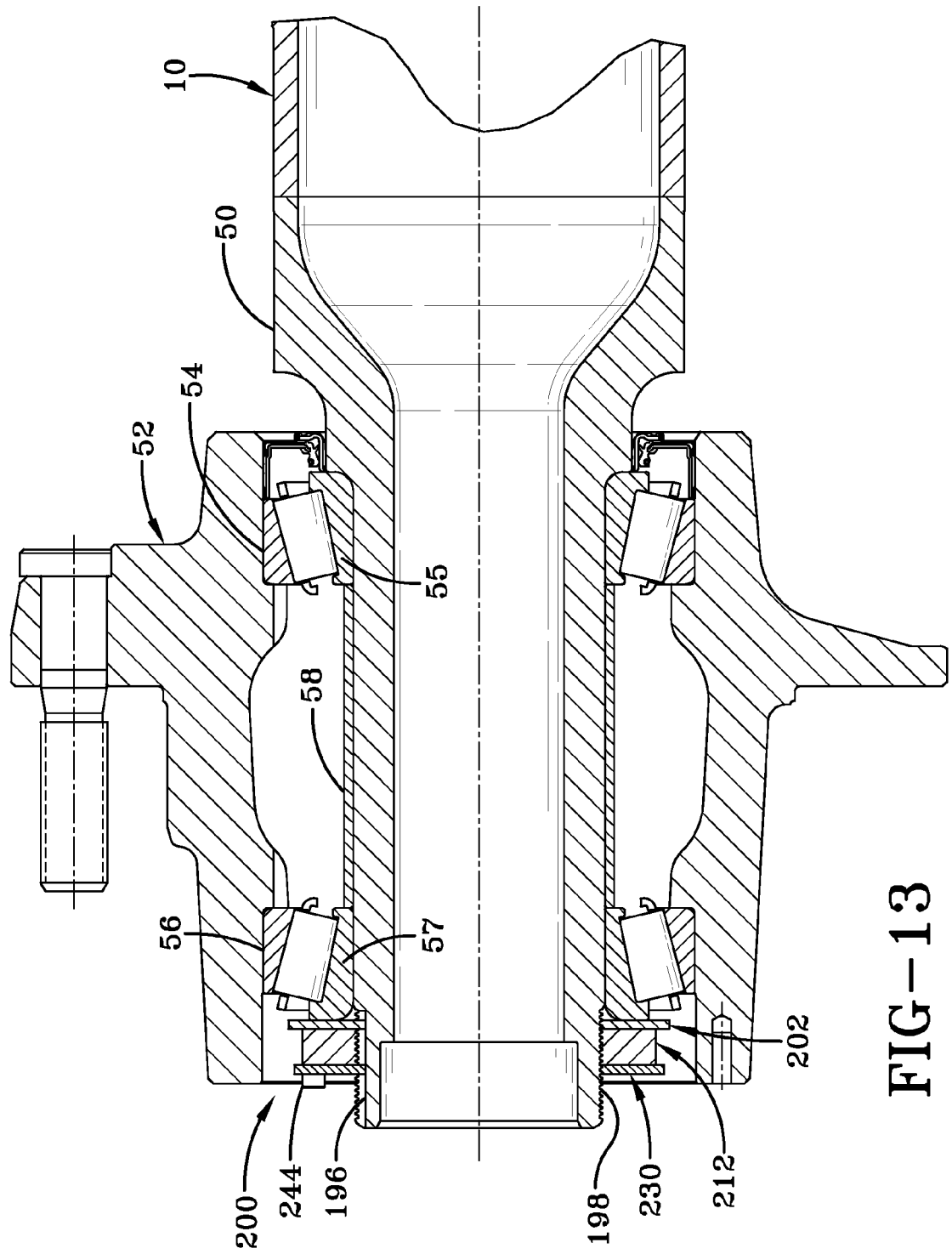
FIG. 13 is a view similar to FIG. 7, shown with the wheel end assembly incorporating a bearing spacer.

Turning now to FIG. 13, while the invention has been described above with reference to a light preload application, axle spindle nut assembly 200 also finds application, with appropriate design adjustments, in heavy preload applications, such as wheel end assembly 52 which uses spacer 58 between bearings 54, 56, or a unitized hub system 62 where the bearing cones contact each other (FIG. 4). Optionally, an indexing system may be used to distinguish between light preload and heavy preload applications for axle spindle nut assembly 200. For example, in a light preload application, screw holes 226 in nut 212 may be spaced approximately 90 degrees apart, while in a heavy preload application, in which the nut may be torqued to about 700 foot-pounds, the screw holes may be spaced about 180 degrees apart.

Moreover, as shown in FIGS. 8-10, axle spindle nut assembly 200 optionally may include a visual indexing system when inner washer 202 is used, which may find particular use in heavy preload applications. More particularly, inner washer 202 may be formed with equally circumferentially-spaced radial graduations 154, preferably formed on both inboard and outboard faces 204, 206, respectively, and which extend radially outwardly to an outer periphery 209 of the washer. Alternatively, graduations 154 may be formed along the edge of outer periphery 209 of inner washer 202. Since inner washer tab 210 engages axle spindle keyway 196, which prevents rotation of inner washer 202, graduations 154 provide a set radial index.

Spindle nut 212 is formed with an indicator mark or notch 163 on its outboard face 220. Nut 212 is installed on axle spindle 50 and is torqued to a level that is within the capacity of most repair facility torque wrenches, such as about 250 foot-pounds. Then, to reach a higher clamp load, spindle nut 112 is rotated a specific number of graduations 154, as measured by comparing indicator mark 163 on the nut to the graduations formed on inner washer 202. In this manner, nut 212 is rotated the proper distance to reach the desired clamp load, and thus the optimum preload on bearing cones 55, 57 and any bearing spacer 58 (FIG. 13) of the bearing cone and spacer group. It should be noted that indicator mark 163 may alternatively be formed on inner washer 202, while graduations 154 may be formed on nut 212, without affecting the overall concept of the invention. Moreover, a feature such as a corner of wrench flats 222 on nut 212 may be selected as an alternative to mark 163, also without affecting the overall concept of the invention. In this manner, first embodiment axle spindle nut assembly 200 of the present invention enables a technician to attain the proper position of nut 212 and thus the proper clamp load, even though that load may be in excess of the capability of an available torque wrench.

Turning now to FIGS. 14-18, a second embodiment axle spindle nut assembly of the present invention is shown and is indicated generally at 250. Second embodiment axle spindle nut assembly 250 is similar in structure and operation to first embodiment axle spindle nut assembly 200, with the exception that mating features formed on a nut 252 and an outer washer 274 are different from mating features 228, 240 formed on nut 212 and outer washer 230 of the first embodiment axle spindle nut assembly (FIG. 8).

Figure 14:
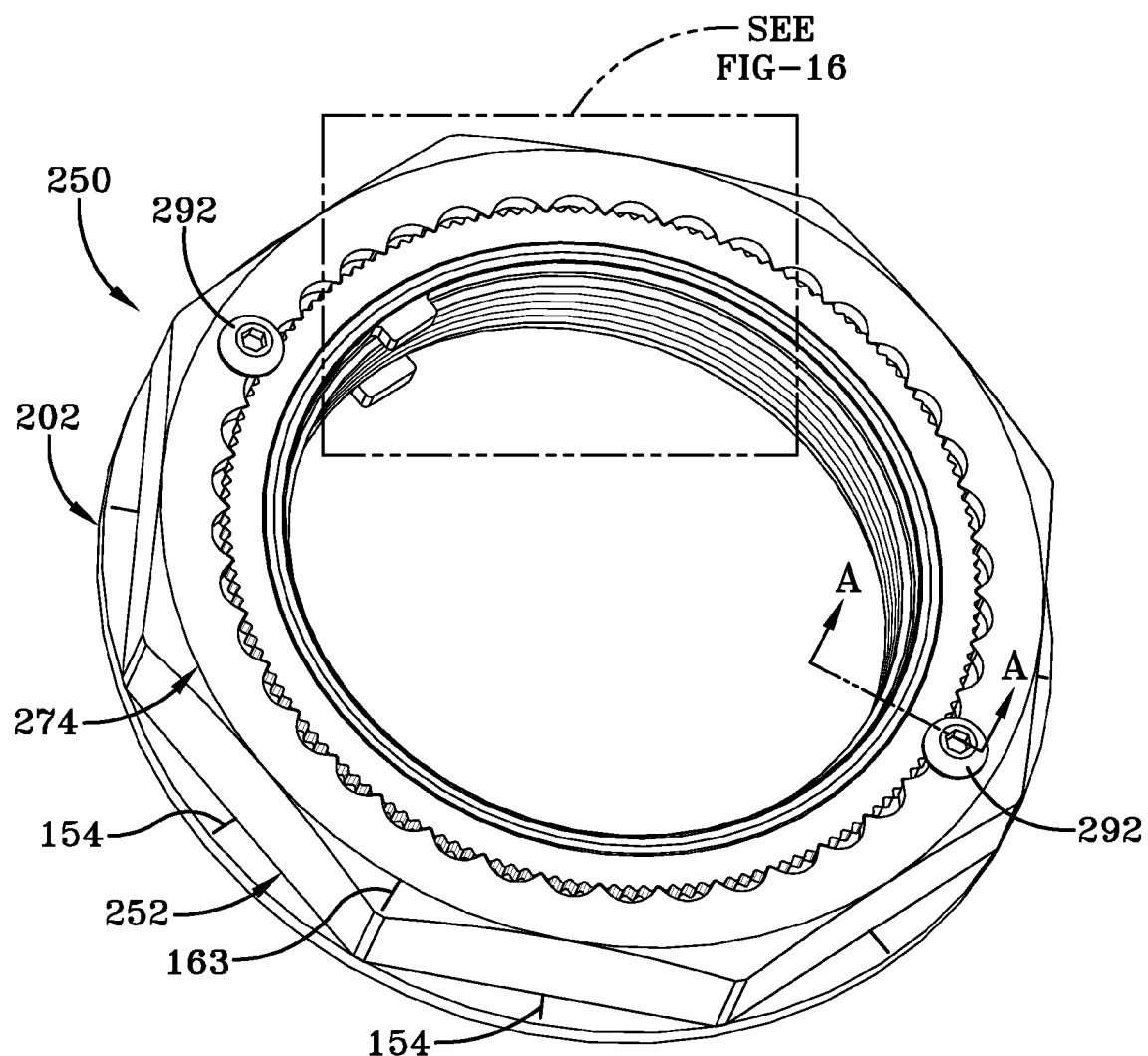
FIG. 14 is an assembled outboard perspective view of a second embodiment axle spindle nut assembly of the present invention.
Figure 15:
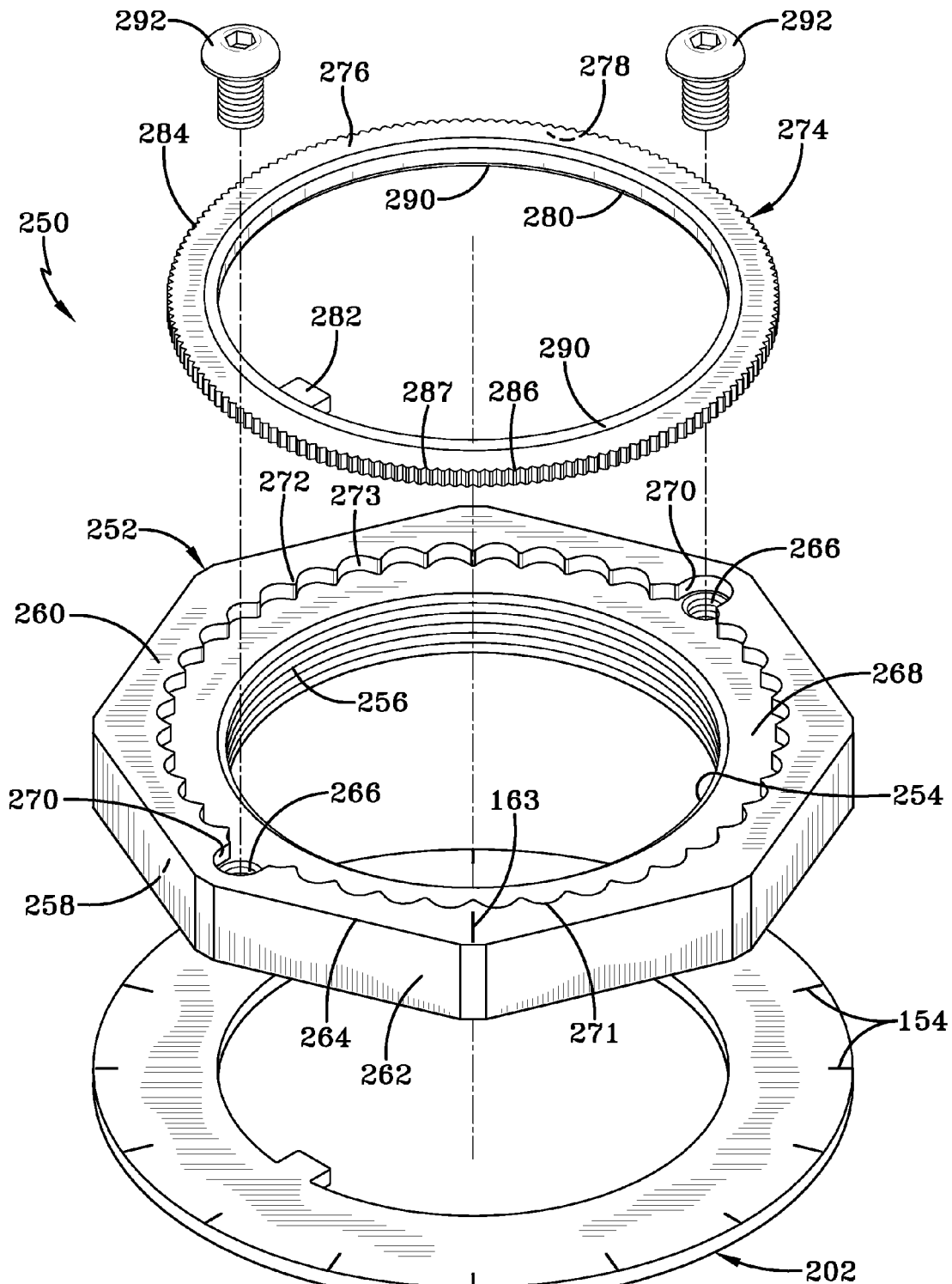
FIG. 15 is an exploded outboard perspective view of the axle spindle nut assembly shown in FIG. 14.

With reference now to FIGS. 14 and 15, second embodiment axle spindle nut assembly 250 includes an optional inner washer 202, an axle spindle nut 252, an outer washer 274, and at least one screw 292. Axle spindle nut 252, washers 202, 274 and screw 292 cooperate to secure bearings 54, 56 of wheel end assembly 52 in place, and to preload bearing cones 55, 57 (FIG. 7). More particularly, inner washer 202 is the same inner washer that is described above for first embodiment axle spindle nut assembly 200, and also is optional for use with second embodiment axle spindle nut assembly 250.

Nut 252 includes threads 256 formed along an inner periphery 254 of the nut, which engage threads 198 (FIG. 7) formed on the outer periphery of the outboard end of axle spindle 50. Nut 252 thus is threaded onto the outboard end of axle spindle 50 until an inboard face 258 of the nut contacts inner washer outboard face 206, when the inner washer is used. If inner washer 202 is not used, inboard face 258 of nut 252 directly contacts outboard bearing cone 57 of wheel end assembly 52 in an assembled state. Nut 252 also includes an outboard face 260, which is proximate to and contacts outer washer 274 in an assembled state, as will be described in greater detail below. Wrench flats 262 are formed on an outer periphery 264 of nut 252, which facilitate installation and removal of the nut. Once nut 252 is in contact with inner washer 202 or outboard bearing cone 57, a specified torquing and hub spinning methodology, as known to those skilled in the art, is used to seat the rollers of bearings 54, 56.

Once the rollers of bearings 54, 56 are seated using the above-described torquing and hub spinning methodology, nut 252 is tightened to a predetermined level, as described above. Nut outboard face 220 is formed with a circumferential recess 268 proximate inner periphery 254 to receive and capture outer washer 274. An outer edge 271 of recess 268 is formed with features 272, such as radially inwardly extending teeth. Radially outwardly extending grooves 273 are formed between teeth 272. The pattern and geometry of teeth 272 the teeth to engage mating features that are formed on outer washer 274, as will be described below. Outboard face 260 of nut 252 also is formed with threaded holes 266 for receiving screws 292 to secure outer washer 274 to the nut. A pair of slots 270 are formed in outboard face 260 adjacent to recess 268, with each of the slots being aligned with a respective one of threaded holes 266 to enable insertion of screws 292 into the holes.

With continuing reference to FIGS. 14 and 15, outer washer 274 is formed with a tab 282 on an inner periphery 280, which engages axle spindle keyway 196 (FIG. 7) to prevent the outer washer from rotating once it is installed on axle spindle 50. Outer washer 274 is formed with features 286, such as radially outwardly extending teeth, on an outer periphery 284. Radially inwardly extending grooves 287 are formed between teeth 286. Radially inwardly extending teeth 272 formed on nut 252 extend into selected ones of grooves 287 in outer washer 274, while radially outwardly-extending teeth 286 formed on the outer washer extend into grooves 273 in the nut. In this manner, radially inwardly extending teeth 272 formed on nut 252 positively mechanically engage and interlock with mating radially outwardly extending teeth 286 formed on outer washer 274, once the outer washer is installed.

More particularly, turning now to FIG. 16, nut 252 preferably is formed of a robust material and/or hardened in order to enable it to provide the required clamp force. Because of such a robustness requirement, the number of teeth 272 that may be economically formed in recess 268 of nut is limited. For example, nut 252 may be able to be formed economically with about forty (40) to eighty (80) teeth 272, and a corresponding number of grooves 273 between the teeth. As described above for first embodiment axle spindle nut assembly 200, it is desirable to provide a relatively high number of mating features on nut 252 and outer washer 274 to reduce the need to rotate the nut once it has been torqued to the proper level, such as a number greater than eighty (80). Thus, in order to provide a greater probability that outer washer 274 will interlock with nut 252 without having to rotate the nut, outer washer teeth 286 are smaller than nut teeth 272, so that there are at least two outer washer teeth for every nut tooth. As shown in FIG. 16, more than two outer washer teeth 286, and corresponding grooves 287, may be formed for every nut tooth 272, such as four outer washer teeth for every nut tooth.

In order to enable outer washer 274 to be formed with such a high number of teeth 286, the washer is preferably formed by stamping, or by another process known to those skilled in the art that accomplishes such precision forming, such as higher-precision fine blanking. In this manner, outer washer 274 provides fine teeth 286 and grooves 287 that reduce the need to rotate nut 252. Outer washer 274 may further reduce the need to rotate nut 252 by offsetting tab 282 relative to teeth 286 by one-half of a tooth. Thus, when washer 274 is installed on axle spindle 50 and tab 282 engages keyway 196, if a first face 276 of the washer faces nut outboard face 260 and washer teeth 286 do not align with grooves 273 between teeth 272 formed in nut 252, the washer can be removed and flipped so that a second face 278 of the washer faces the nut outboard face, and the washer teeth will have shifted a distance of one-half tooth, and should then matingly align with the grooves between the teeth formed in the nut.

Returning now to FIGS. 14 and 15, outer washer 274 preferably is further formed with circumferentially-extending nubs 290 proximate inner periphery 280. Nubs 290 ensure that screws 292 will firmly secure outer washer 274 to nut 252. More particularly, since outer washer 274 seats in recess 268 formed in nut 252, ideally, the outer washer thickness and the depth of the recess would be equal, enabling screws 292 to clamp the outer washer to the nut. However, variances in the depth of recess 268 and in the thickness of outer washer 274 may cause the outer washer to extend above or below nut outboard face 260, which would reduce the ability of screws 292 to effectively clamp and secure the outer washer to nut 252. For example, if outer washer 274 would extend above nut outboard face 260, screw 292 may not firmly seat on the nut outboard face, which may prevent the screw from firmly clamping the outer washer to the nut. Also, if outer washer 274 would extend below nut outboard face 260, screw 292 may not firmly engage the outer washer, which prevents the screw from firmly clamping the outer washer to the nut.

To ensure that screws 292 adequately clamp outer washer 274 to nut 252, as shown in FIG. 17, nub 290 raises the outer washer above nut outboard face 260 when the washer is seated in nut recess 268. In this manner, nub 290 ensures contact of outer washer 274 with screw 292. As shown in FIG. 18, when screw 292 is tightened, nub 290 acts as a leverage point, so that periphery 284 of outer washer 274 at the nut bends to enable the screw to firmly seat on nut 252. Thus, nub 290 enables screw 292 to contact both outer washer 274 and nut outboard face 260, thereby enabling the screw to firmly clamp the outer washer to the nut. It is to be understood that one of nubs 290 is formed on a first face 276 of outer washer 274, and another nub is formed on a second face 278 of the outer washer, which enables screws 292 to clamp the outer washer to nut 252 when either one of the first and second faces contacts nut recess 268.

Figure 15A:
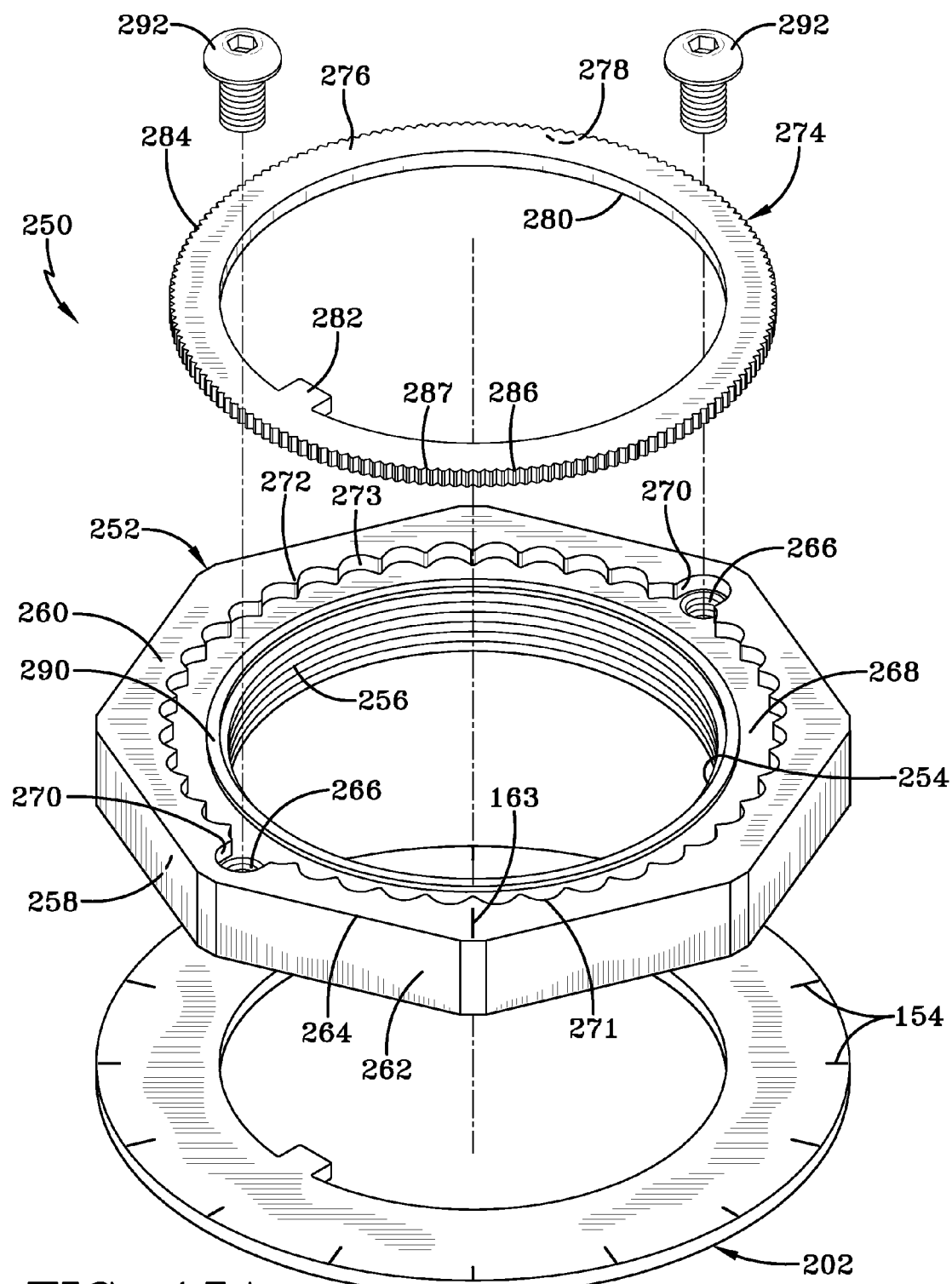
FIG. 15A is an exploded outboard perspective view of the axle spindle nut assembly shown in FIG. 15, but showing a circumferentially-extending nub having a generally curved cross-section located on the nut instead of the outer washer.

It is to be understood that, alternatively, one or more nubs 290 may be formed on nut 252 rather than on outer washer 274 without affecting the overall concept or operation of the invention. For example, nut 252 may be formed with a single circumferentially-extending nub 290 proximate inner periphery 254 on recess 268 (FIG. 15A). In such a case, nub 290 extends toward the outboardmost surface of nut outboard face 260, thereby effectively raising outer washer 274 above the nut outboard face when the outer washer seats in recess 268. In this manner nub 290 formed in nut 252 provides a leverage point to enable screw 292 to contact both outer washer 274 and nut outboard face 260 to firmly clamp the outer washer to the nut.

In this manner, the tightening of screws 292 causes teeth 286 formed on outer periphery 284 of outer washer 274 to engage and interlock with teeth 272 formed in nut 252. Since outer washer 274 is prevented from rotating by the engagement of tab 282 in keyway 196, the positive mechanical engagement of mating teeth 272, 286 secures the outer washer against nut 252 and prevents the nut from rotating. Thus, the positive mechanical engagement of mating teeth 272, 286 provides a lock that resists load forces which can act to unscrew nut 252 and create a possible loss of preload.

It is to be understood that second embodiment axle spindle nut assembly 250 finds application in both low and high preload systems as described above for first embodiment axle spindle nut assembly 200. In addition, the visual indexing system described above for first embodiment axle spindle nut assembly 200 may optionally be used on inner washer 202 and nut 252 of second embodiment axle spindle nut assembly 250 (FIGS. 14-15A).

Figure 15B:
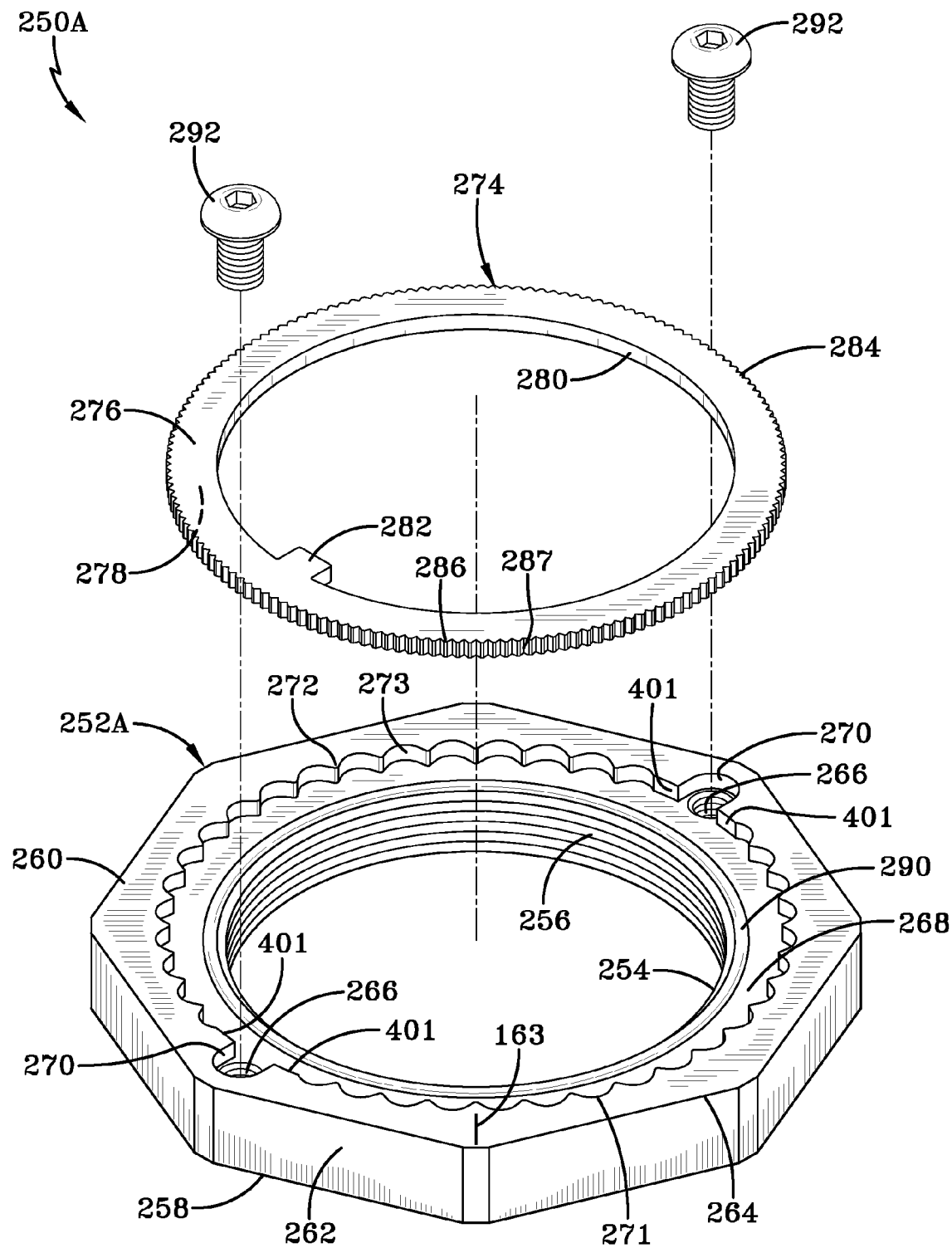
FIG. 15B is an exploded perspective view of a third embodiment of the axle spindle nut assembly of the present invention, and is similar to the axle spindle nut assembly shown in FIG. 15A, except that relief areas are formed between the nut teeth and the nut screw slots.

A third embodiment axle spindle nut assembly is indicated generally at 250A and is shown in FIG. 15B. Third embodiment axle spindle nut assembly 250A is similar to second embodiment axle spindle nut assembly 250, except that nut 252A of the assembly is formed with relief areas 401 intermediate teeth 272 and screw slots 270. By eliminating teeth adjacent to each screw slot 270, in combination with continuous circumferentially-extending nub 290, relief areas 401 facilitate removal of outer washer 274 during repair or replacement of wheel end assembly components. More specifically, upon removal of screws 292, an individual may simply apply inboard pressure to outer washer 274 adjacent to a selected one of the pair of relief areas 401 adjacent to its respective screw slot 270. This inboard pressure will cause outer washer 274 to pivot on nub 290, with the adjacent pair of relief areas 401 facilitating this pivoting, and in turn causing the opposite side of the outer washer adjacent to the opposed screw slot 270 to pop out of nut recess 268.

Figure 15C:
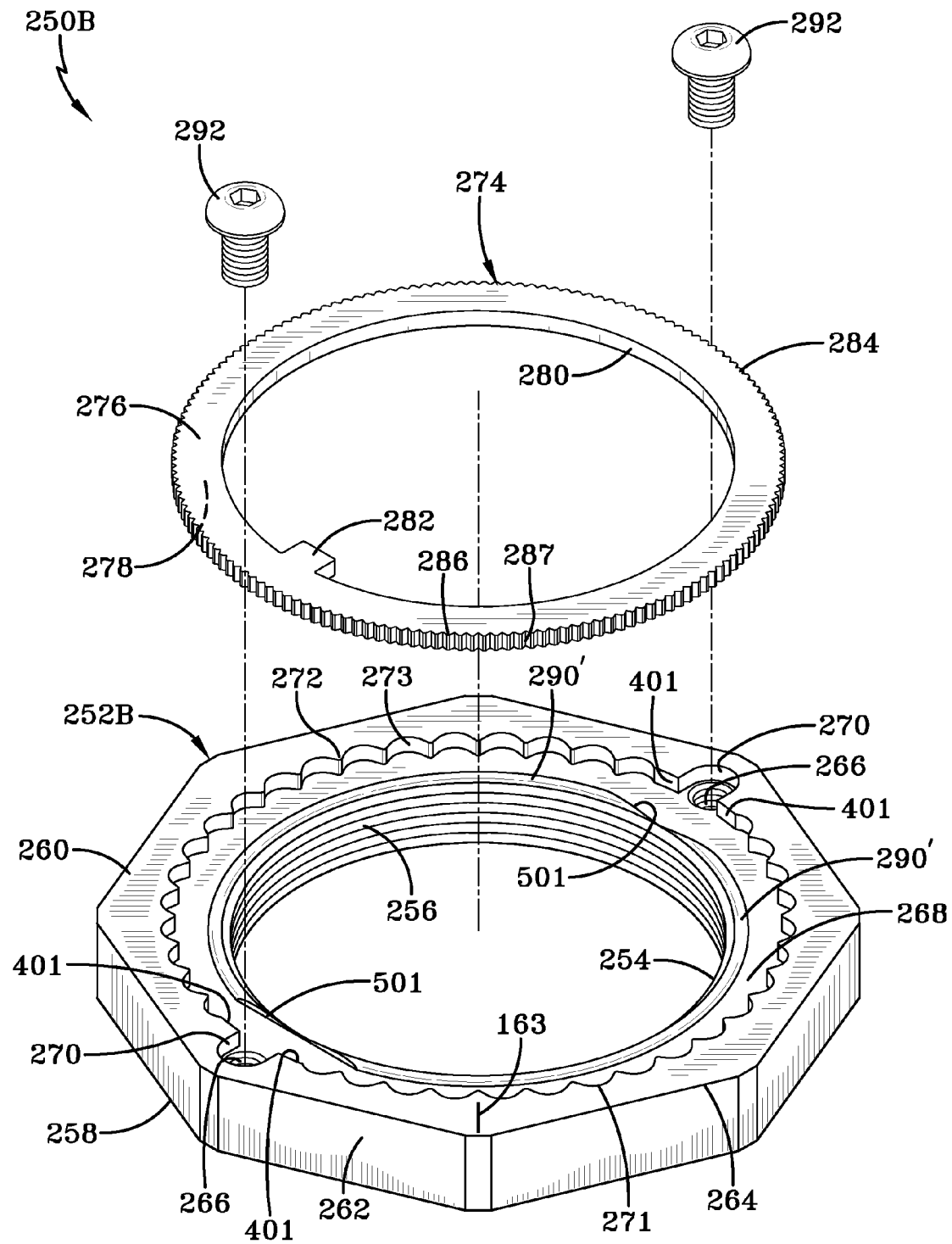
FIG. 15C is an exploded perspective view of a fourth embodiment of the axle spindle nut assembly which is similar to the assembly shown in FIG. 15B, but showing a circumferentially-extending nub formed on the nut having a relief area adjacent to each screw slot.

A fourth embodiment axle spindle nut assembly is indicated generally at 250B and is similar in structure and function to third embodiment axle spindle nut assembly 250A, with the only difference being that axle spindle nut assembly 250B includes a nut 252B in which a circumferentially extending nub 290' is formed with a relief area 501 adjacent to each screw slot 270 (FIG. 15C).

Figure 15D:
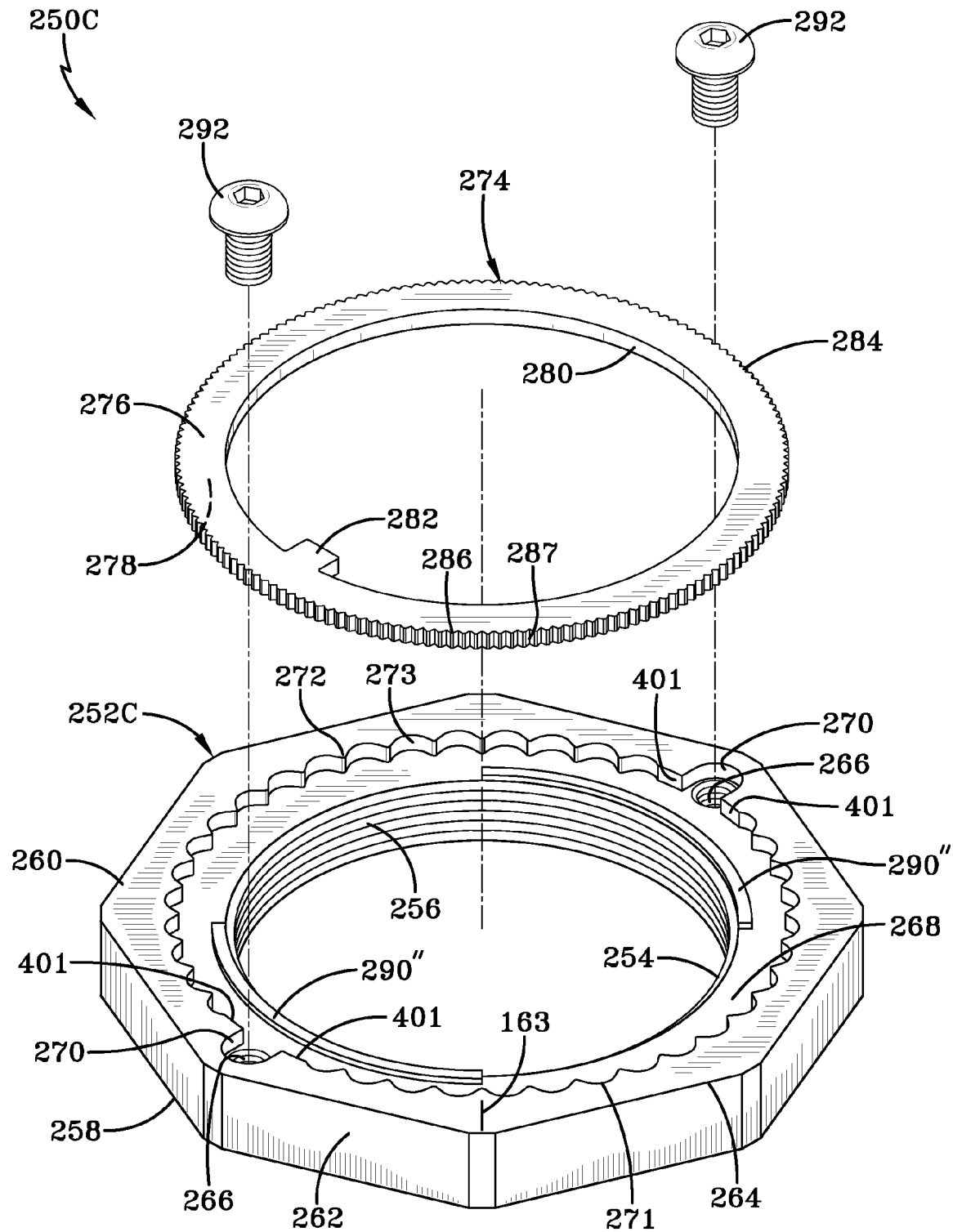
FIG. 15D is an exploded perspective view of a fifth embodiment of the axle spindle nut assembly which is similar to the assemblies shown in FIGS. 15B and 15C, but showing a pair of opposed, generally arcuate-shaped, circumferentially-extending nubs each having a generally rectangular-shaped cross-section, formed on the nut, with each one of the nubs being disposed adjacent to a respective one of the screw slots.

A fifth embodiment axle spindle nut assembly is indicated generally at 250C and is shown in FIG. 15D. Fifth embodiment axle spindle nut assembly 250C is similar to third and fourth embodiment axle spindle nut assemblies 250A and 250B, respectively, with the only difference being that nut 252C is formed with a pair of opposed, circumferentially-extending, generally arcuate-shaped nubs 290". More particularly, each nub 290" is disposed adjacent to a respective one of screw slots 270 and has a generally rectangular-shaped cross section. It is understood that each nub 290" could have other cross-sectional shapes without affecting the overall concept of the invention. It is also understood that the location of nubs 290" could be opposed along certain various other locations of nut recess 268 proximate nut inner periphery 254, and have various lengths, without affecting the overall concept of the invention.

A sixth embodiment axle spindle nut assembly is indicated generally at 250D and is shown in FIGS. 15E and 15F. Sixth embodiment axle spindle nut assembly 250D is similar to third, fourth, and fifth embodiment axle spindle nut assemblies 250A, 250B, and 250C, respectively, with the only difference being that recess 268 of nut 252C is formed with a circumferentially extending nub or ramp 290''' proximate nut inner periphery 254, having a generally triangular-shaped cross-section (FIG. 15).

It is understood that optional washer 202 having graduations 154, can be used with third, fourth, fifth, and sixth embodiment axle spindle nut assemblies 250A-D, and nuts 252A-D each having an indicator mark 163, respectively, without affecting the overall concept of the present invention. It is further understood that circumferentially-extending nubs 290, 290', circumferentially-extending arcuate-shaped nubs 290", and circumferentially-extending nub or ramp 290''', each could be disposed on outer washer 274 of axle spindle nut assemblies 250A-D, respectively, without affecting the overall concept of the invention.

Turning now to FIGS. 19-22, a seventh embodiment axle spindle nut assembly of the present invention is shown and is indicated generally at 300. Third embodiment axle spindle nut assembly 300 is similar in structure and operation to first embodiment axle spindle nut assembly 200 and second embodiment axle spindle nut assembly 250, with the exception that mating features formed on a nut 302 and an outer washer 310 are formed differently than mating features 228, 240 formed on nut 212 and outer washer 230 of the first embodiment axle spindle nut assembly (FIG. 8) and mating features 272, 286 formed on nut 252 and outer washer 274 of the second embodiment axle spindle nut assembly (FIG. 15).

Figure 20:
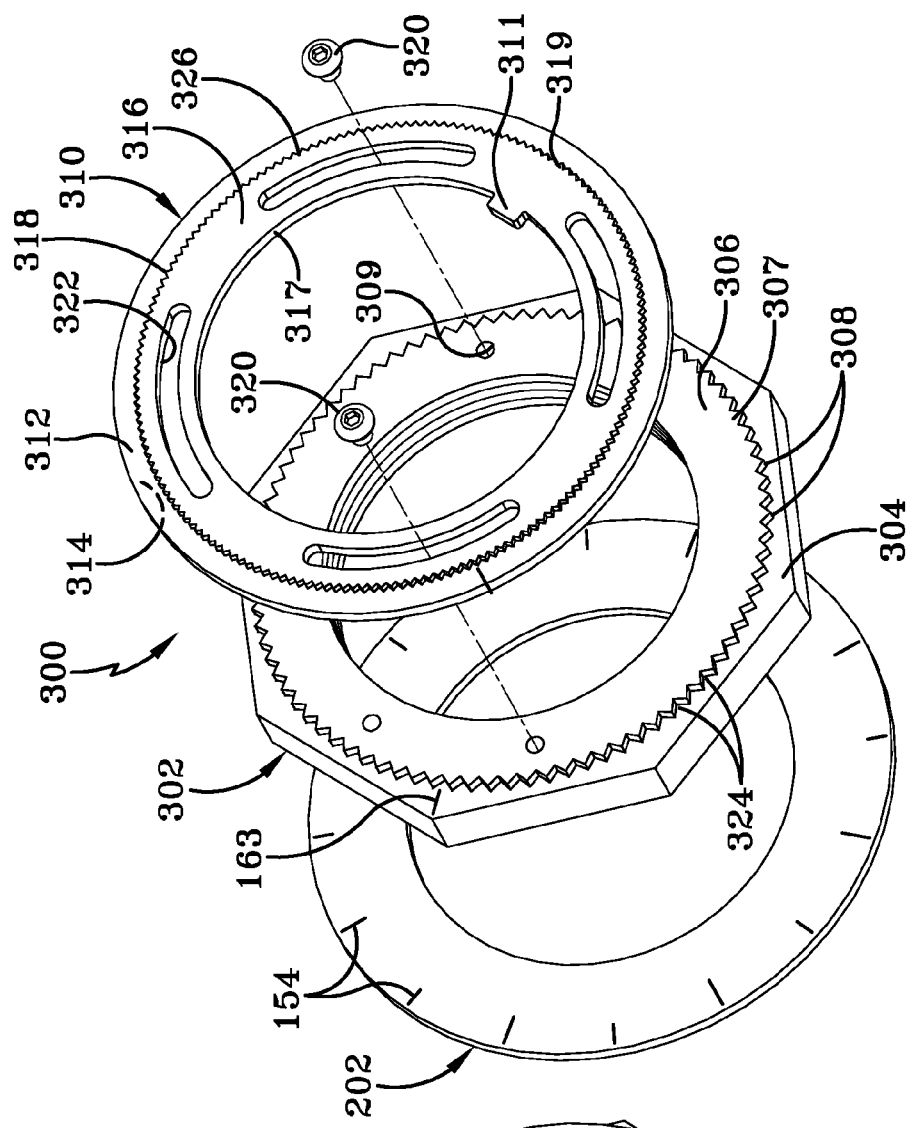
FIG. 20 is an exploded outboard perspective view of the axle spindle nut assembly shown in FIG. 19.
Figure 19:
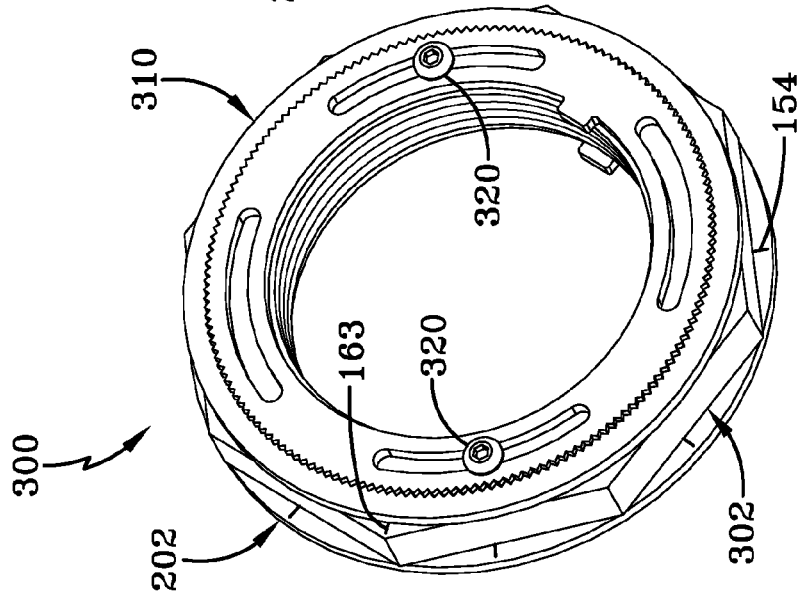
FIG. 19 is an assembled outboard perspective view of a seventh embodiment axle spindle nut assembly of the present invention.

With reference now to FIGS. 19 and 20, third embodiment axle spindle nut assembly 300 includes an optional inner washer 202, an axle spindle nut 302, an outer washer 310, and at least one screw 320. Axle spindle nut 302, washers 202, 302 and screw 320 cooperate to secure bearings 54, 56 of wheel end assembly 52 in place, and to preload bearing cones 55, 57 (FIG. 7). More particularly, inner washer 202 is the same inner washer that is described above for first embodiment axle spindle nut assembly 200, and also is optional for use with third embodiment axle spindle nut assembly 300.

Figure 21:
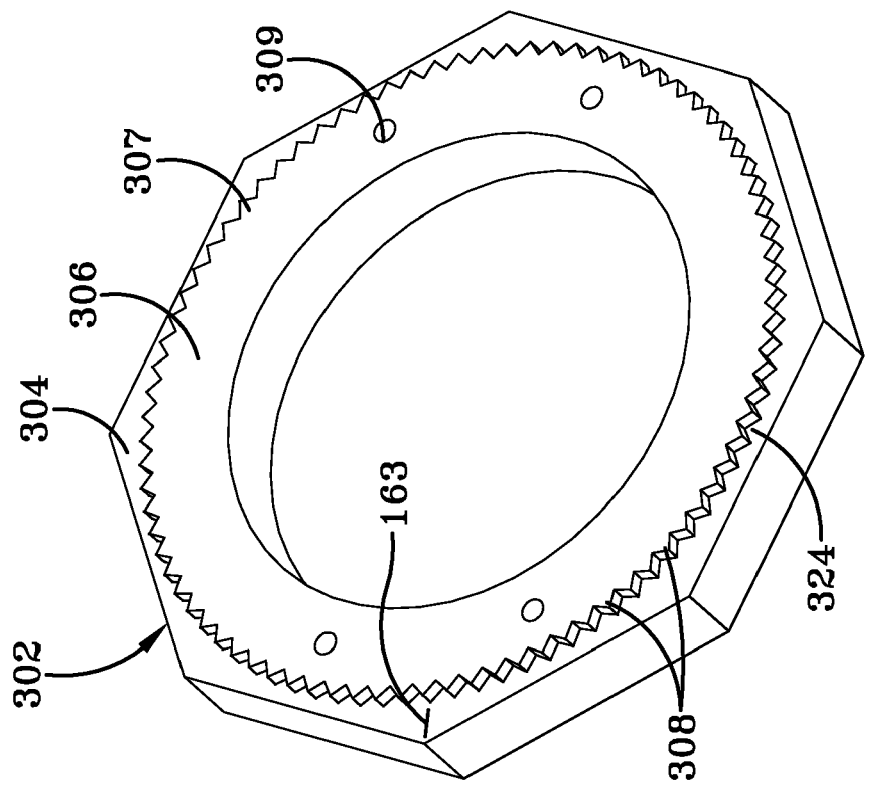
FIG. 21 is a perspective view of a nut of the axle spindle nut assembly shown in FIG. 19.

Third embodiment nut 302 is similar in construction to second embodiment nut 252, described above. Therefore, only the differences between third embodiment nut 302 and second embodiment nut 252 will be described. As shown in FIG. 21, nut 302 includes an outboard face 304, which is formed with a raised pattern 306 that engages outer washer 310. An outer edge 307 of raised pattern 306 is formed with features 308, such as radially outwardly extending teeth. Radially inwardly extending grooves 324 are formed between teeth 308. The pattern and geometry of teeth 308 enable the teeth to engage mating features that are formed on outer washer 310, as will be described below. Outboard face 304 of nut 302 also is formed with threaded holes 309 for receiving screws 320 to secure outer washer 310 to the nut.

Figure 22:
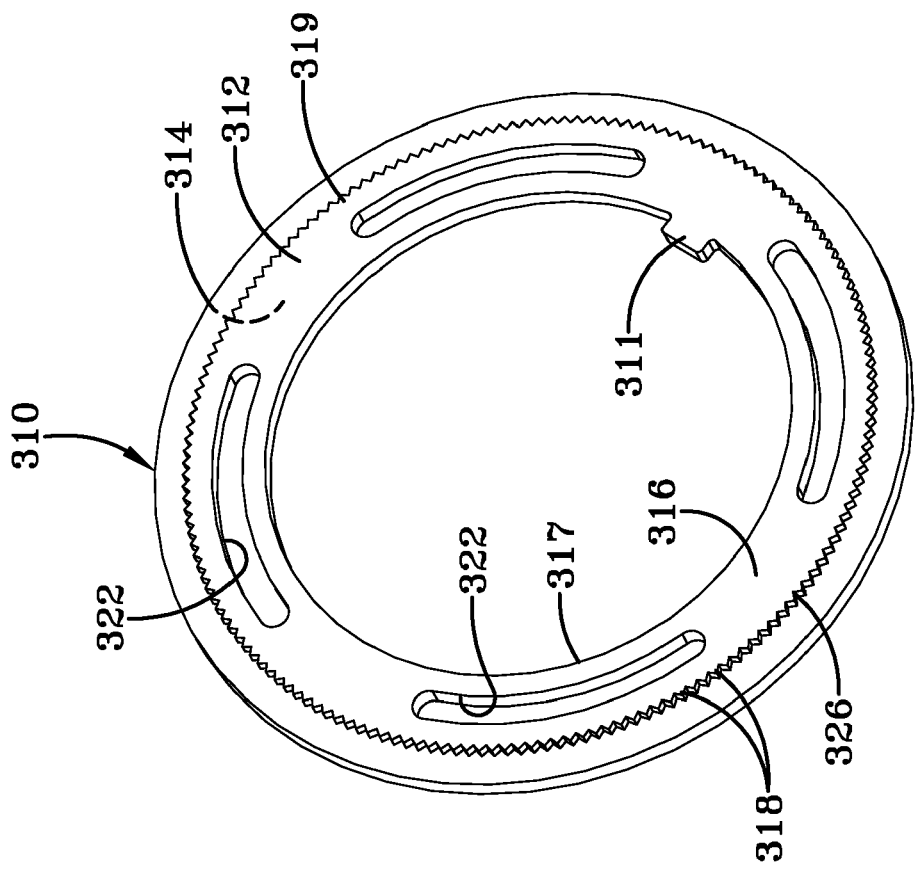
FIG. 22 is a perspective view of an outer washer of the axle spindle nut assembly shown in FIG. 19.

With reference now to FIG. 22, outer washer 310 is formed with a tab 311, which engages axle spindle keyway 196 (FIG. 7) as described above for first and second embodiment outer washers 230, 274. Outer washer 310 includes a first face 312 and a second face 314. At least one of first face 312 and second face 314 is formed with a recess 316 proximate an inner circumference 317 of washer 310. An outer edge 319 of recess 316 is formed with radially inwardly extending features 318, such as teeth. Radially outwardly extending grooves 326 are formed between teeth 318. Radially outwardly extending teeth 308 formed on nut 302 extend into selected ones of grooves 326 in outer washer 310, while radially inwardly-extending teeth 318 formed on the outer washer extend into grooves 324 in the nut. In this manner, radially outwardly extending teeth 308 formed on nut 302 positively mechanically engage and interlock with mating radially inwardly extending teeth 318 formed on outer washer 310, once the outer washer is installed.

As described above for second embodiment nut 252, third embodiment nut 302 preferably is formed of a robust material and/or hardened in order to enable it to provide the required clamp force. Because of such a robustness requirement, the number of teeth 308 that may be economically formed on raised pattern 306 is limited, such as to about forty (40) to eighty (80) teeth, and a corresponding number of grooves 324 between the teeth. In order to provide a greater probability that outer washer 310 and nut 302 will interlock without having to rotate the nut, teeth 318 and corresponding grooves 326 formed in the outer washer are smaller than teeth 308 formed the nut. More particularly, outer washer 310 preferably is stamped, enabling teeth 318 to operate in a manner similar to that as described above for teeth 286 formed on second embodiment washer 274.

Outer washer 310 also is formed with curved slots 322, which enable screws 320 to threadably engage holes 309 formed in nut 302 and secure the outer washer to the nut. Slots 320 are formed to be nonsymmetrically aligned with respect to outer washer tab 311, and thus are similar in structure and operation as slots 242 described above in first embodiment outer washer 230. Optionally, to provide additional ease of alignment of screws 320 with threaded holes 309 formed in nut 302, additional holes, such as four holes, may be formed in outboard face 304 of the nut. In this manner, at least two holes 309 align with slots 322 regardless of which face 312, 314 of washer 310 faces nut 302, allowing two screws 320 to be inserted without the need to flip the washer over. Moreover, to enable further flexibility in the assembly of third embodiment axle spindle nut assembly 300, both first and second faces 312, 314 of outer washer 310 may be formed with recess 316 and features 318.

In this manner, the tightening of screws 320 causes teeth 318 formed in recess 316 of outer washer 310 to engage and interlock with teeth 308 formed on raised patter 306 of nut 302. Since outer washer 310 is prevented from rotating by the engagement of tab 311 in keyway 196, the positive mechanical engagement of mating teeth 308, 318 secures the outer washer against nut 302 and prevents the nut from rotating. Thus, the positive mechanical engagement of mating teeth 308, 318 provides a lock that resists load forces which can act to unscrew nut 302 and create a possible loss of preload.

It is to be understood that seventh embodiment axle spindle nut assembly 300 finds application in both low and high preload systems as described above for first embodiment axle spindle nut assembly 200 and second embodiment axle spindle nut assembly 250. In addition, the visual indexing system described above for first embodiment axle spindle nut assembly 200 may be used on inner washer 202 and nut 302 of third embodiment axle spindle nut assembly 300 (FIGS. 19-21).

With this construction, axle spindle nut assembly 200, 250, 250A-D, 300 of the present invention overcomes the disadvantages of prior art axle spindle nut assemblies 29, 68. For example, axle spindle nut assembly 200, 250, 250A-D, 300 is relatively easy to install, utilizing a single nut 212, 252, 252A-D, 302, respectively, which is threaded onto axle spindle 50 and is torqued into place, without the need to assemble and torque multiple prior-art nuts 30, 34, 70, 74 through a complex procedure. The use of a simplified procedure decreases the time involved to assemble wheel end assembly 52, and the reduced number of parts decreases the possibility that a component or step in the assembly process may be omitted, thereby facilitating proper installation of axle spindle nut assembly 200, 250, 250A-D, 300 and proper preloading of bearing cones 55, 57 and bearing spacer 58 of the bearing cone and spacer group. In addition, the single-nut construction of axle spindle nut assembly 200, 250, 250A-D, 300 minimizes the possibility that nut 212, 252, 252A-D, 302, respectively, may be under or over-torqued during installation, enhancing the ability of an installer to properly preload the bearing cone and spacer group.

Such ease of installation and improved simplified construction of axle spindle nut assembly 200, 250, 250A-D, 300 of the present invention provides more accurate, reliable and repeatable achievement of the proper clamp load on bearing cones 55, 57 of the bearing cone and spacer group, as compared to certain prior art axle spindle nut assemblies 29, 68. Such proper clamp load achievement reduces potential excessive axial end play of the wheel end assembly due to underloading of the bearing cone and spacer group, which in turn reduces movement of main seal 126 and increases the life of the main seal and bearings 54, 56.

In addition, the use of one nut 212, 252, 252A-D, 302, as opposed to prior art multiple-nut assemblies 29, 68, eliminates the possibility that installation of an outer nut after installation of an inner nut may cause the inner nut to loosen during installation of axle spindle nut assembly, and during operation of the vehicle. Moreover, the engagement of features 228, 272, 308 formed on each respective nut 212, 252, 252A-D, 302 with mating features 240, 286, 318 formed on each respective outer washer 230, 274, 310 provides a locking system to further reduce the potential loosening of the nut, and subsequent loss of preload, once each respective axle spindle nut assembly 200, 250, 250A-D, 300 is installed.

Moreover, the large number of features 228, 272, 308 formed on each respective nut 212, 252, 252A-D, 302 and mating features 240, 286, 318 formed on each respective outer washer 230, 274, 310 of each respective axle spindle nut assembly 200, 250, 250A-D, 300, reduces or eliminates undesirable rotation of the nut once the nut has been torqued to a proper level. More particularly, once each respective nut 212, 252, 252A-D, 302 is torqued to the desired level, its position is set and any other rotation of the nut undesirably changes the torque level. However, in certain prior art axle spindle nut assemblies, the nut must be rotated an axial distance of at least one and one-quarter thousandths (0.00125) of an inch to enable an outer washer to align with the nut, thereby significantly changing the torque level of the nut. In axle spindle nut assembly 200, 250, 250A-D, 300 of the present invention, the above-described large number of mating features 228, 240, 272, 286, 308, 318 formed on each respective nut 212, 252, 252A-D, 302 and outer washer 230, 274, 310, respectively, reduces any such additional axial rotation of the nut to a distance in a range of from about zero (0.00000) to about one-half of one thousandth (0.00050) of an inch, and preferably from about zero (0.00000) to about one-quarter of one thousandth (0.00025) of an inch. Such a reduction of any axial rotation of nut 212, 252, 252A-D, 302 reduces or eliminates the possibility of undesirably affecting the torque level of the nut after the proper level has been reached.

Also, the engagement of features 228, 272, 308 formed on each respective nut 212, 252, 252A-D, 302 with mating features 240, 286, 318 formed on each respective outer washer 230, 274, 310, increases the strength of the connection between the outer washer and the nut of each respective axle spindle nut assembly 200, 250, 250A-D, 300, thereby preventing the nut from undesirably rotating as the vehicle travels over-the-road. More particularly, forces encountered by a heavy-duty vehicle as it travels over-the-road can shear a relatively weak connection between nut 212, 252, 252A-D, 302 and outer washer 230, 274, 310 which then enables the nut to undesirably rotate. By providing a large number of features 228, 272, 308 spaced about the circumference of each respective nut 212, 252, 252A-D, 302 which mate with opposing features 240, 286, 318 formed on each respective outer washer 230, 274, 310, a multiple-point circumferential connection is established between the nut and the washer. This connection enables the forces encountered by axle spindle nut assembly 200, 250, 250A-D, 300 to be distributed, thereby strengthening the connection between nut 212, 252, 252A-D, 302 and washer 230, 274, 310 to reduce the potential of undesirable rotation of the nut during vehicle operation.

Axle spindle nut assembly 200, 250, 250A-D, 300 of the present invention also optionally includes a visual indication of when the proper position of each respective nut 212, 252, 252A-D, 302 has been attained. More particularly, the use of graduations 154 on inner washer 202 and indicator mark 163 on each respective nut 212, 252, 252A-D, 302 enables a technician to determine when the nut has been rotated to its proper position in the event that an available torque wrench cannot reach the required torque level, thereby reducing the potential of undesirably over or under rotating the nut.

Furthermore, in regard to first and third embodiments axle spindle nut assembly, 200, 300, in the event that outer washer 230, 310 has not been tightened against nut 212, 302 by screws 244, 320, which potentially precludes washer features 240, 318 from interlocking with nut features 228, 308, potential rotation of the nut will be limited by the engagement of at least one of the screws with an end of a respective washer slot 242, 322, respectively.

Also, circumferentially extending nubs 290, 290', opposed circumferentially-extending arcuate-shaped nubs 290", and circumferentially extending nub or ramp 290''', whether disposed on its respective nut 252A-D or outer washer 274, respectively, each aids in providing a leverage point to enable screws 292 to contact both outer washer 274 and respective nut outboard face 260 to firmly clamp the outer washer to the nut. Moreover, nuts 252A-D, formed with relief areas 401 between nut teeth 272 and nut slots 270, in combination with circumferentially extending nubs 290, 290', circumferentially-extending arcuate-shaped nubs 290", and circumferentially extending nub or ramp 290''', each facilitates removal of outer washer 274 from its respective nut 252A-D as described hereinabove for servicing the wheel end assembly.

Axle spindle nut assembly 200, 250, 250A-D, 300 of the present invention is a reusable, economical and convenient system, utilizing only one thread engaging nut 212, 252, 252A-D, 302, one outer washer, 230, 274, 310, two small cap screws 244, 292, 320, and one optional inner washer 202. This simple design with robust interlock tabs 210, 238, 282, 311 eliminates the need for complicated designs, as with other single-piece nut systems of the prior art, such as those utilizing an expensive powder metal construction or a delicate pin mechanism. Axle spindle nut assembly 200, 250, 250A-D, 300, in employing a positive mechanical lock between features 228, 272, 308 formed on each respective nut 212, 252, 252A-D, 302 and mating features 240, 286, 318 formed on each respective outer washer 230, 274, 310, does not rely on less-dependable friction for a locking feature as in certain prior art split nut systems.

It is to be understood that other forms, patterns and combinations of features other than those described above may be used without affecting the overall concept or operation of the invention. Moreover, the location and number of holes formed in the nut to accept screws may be adapted for particular design requirements without affecting the overall concept or operation of the invention. Furthermore, fastening means other than screws may be used to secure the outer washer and nut without affecting the overall concept or operation of the invention, such as bolts, rivets, dowels, interlocking pins, and the like. It is also understood that axle spindle nut assemblies 200, 250, 250A-D, 300 can be formed by various processes known to those of ordinary skill in the art, including forging, casting, machining, and powdered metal processes.

The present invention also includes a method for assembling a wheel end assembly on an axle spindle using an axle spindle nut assembly in a convenient manner to achieve proper preloading of the bearing cone and spacer group of the wheel end assembly. The method includes steps in accordance with the description that is presented above and shown in FIGS. 7-22.

It is understood that the present invention finds application in all types of axle spindles and wheel end assemblies known to those skilled in the art, including other types of axle spindles and wheel end assemblies than those shown and described herein and known to those skilled in the art, without affecting the concept or operation of the invention. Moreover, while the present invention has been described with reference to specific embodiments, it is understood that this description and illustration is by way of example and not by way of limitation. Potential modifications and alterations will occur to others upon a reading and understanding of this disclosure, and it is understood that the invention includes all such modifications and alterations and equivalents thereof.

Accordingly, the axle spindle nut assembly of the present invention is simplified, provides an effective, safe, inexpensive, and efficient structure which achieves all the enumerated objectives, provides for eliminating difficulties encountered with prior-art axle spindle nut assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved axle spindle nut assembly is constructed, arranged and used, the characteristics of the construction and arrangement, and the advantageous, new and useful results obtained; the new and useful steps, structures, devices, elements, arrangements, parts and combinations, are set forth in the appended claims.

What is claimed is:

1. An axle spindle nut assembly securing a wheel end assembly of a heavy-duty vehicle on an axle spindle of an axle, said axle spindle having an outboard end formed with a keyway and threads, said wheel end assembly including an outboard bearing and an inboard bearing immovably mounted on the axle spindle for rotatably mounting a wheel hub on said axle spindle, said axle spindle nut assembly comprising:
   a nut formed with threads for threadably engaging said axle spindle threads, said nut capable of being tightened to a selected torque level against said outboard bearing, and having an outboard surface formed with a plurality of features, said features including a recess with radially inwardly extending teeth, said recess communicating with a pair of spaced-apart slots and the recess being formed with relief areas free of said teeth adjacent to each one of said pair of slots;
   a washer disposed outboard of said nut on said axle spindle, said washer being formed with a tab for engaging said keyway of the axle spindle to prevent rotation of the washer about said axle spindle, said washer further being formed with a plurality of mating features for mechanically engaging said radially inwardly extending teeth of said nut, said mating features including radially outwardly extending teeth formed on an outer periphery of the washer whereby substantial rotation of said nut is prevented, and a selected one of said washer and said nut being formed with at least one generally circumferentially-extending nub; and
   a pair of fasteners for securing said washer to said nut by insertion of said fasteners into respective ones of said slots, whereby said nub aids contact by the fasteners with the washer and the nut so that said washer is secured to said nut and is removable by removal of said fasteners and application of inboard pressure against the washer at a selected one of said slot relief areas of the nut.

2. The axle spindle nut assembly of claim 1, in which the number of said teeth formed on said washer outer periphery is greater than the number of said teeth formed in said recess of said nut outboard surface.

3. The axle spindle nut assembly of claim 1, in which said washer is a first washer, and further comprising a second washer disposed between said nut and said outboard bearing.

4. The axle spindle nut assembly of claim 3, in which said second washer is formed with a tab for engaging said keyway of said axle spindle to prevent rotation of the second washer about said axle spindle.

5. The axle spindle nut assembly of claim 3, in which said second washer is formed with graduations, and in which said nut is formed with an indicator mark, whereby the position of said indicator mark relative to said graduations indicates the rotational position of said nut.

6. The axle spindle nut assembly of claim 1 in which said at least one generally circumferentially-extending nub is a continuous nub extending along an entire inner periphery of a selected one of said nut recess and said washer.

7. The axle spindle nut assembly of claim 1, in which said at least one generally circumferentially-extending nub is a continuous nub extending along an entire inner periphery of a selected one of said nut recess and said washer, and in which said nub is formed with spaced-apart opposed relief areas.

8. The axle spindle nut assembly of claim 1, in which said at least one generally circumferentially-extending nub is a pair of opposed, generally arcuate-shaped nubs, each one of said nubs extending along a portion of an inner periphery of a selected one of said nut recess and said washer.

9. The axle spindle nut assembly of claim 1, in which said at least one generally circumferentially-extending nub has a cross-sectional generally curved-shape.

10. The axle spindle nut assembly of claim 1, in which said at least one generally circumferentially-extending nub has a cross-sectional generally triangular-shape.

11. An axle spindle nut assembly a securing a wheel end assembly of a heavy-duty vehicle on an axle spindle of an axle, said axle spindle having an outboard end formed with a keyway and threads, said wheel end assembly including an outboard bearing and an inboard bearing immovably mounted on the axle spindle for rotatably mounting a wheel hub on said axle spindle, said axle spindle nut assembly comprising:
   a first washer formed with an inboard surface and an outboard surface, said first washer being disposed on said axle spindle with said inboard surface adjacent to said outboard bearing;
   a nut formed with threads for threadably engaging said axle spindle threads, said nut capable of being tightened to a selected torque level against said outboard surface of said first washer, and having an outboard surface formed with a plurality of features, said features including a recess with radially inwardly extending teeth, said recess communicating with a pair of spaced-apart slots and said recess being formed with relief areas free of said teeth adjacent to each one of said pair of slots;
   a second washer disposed outboard of said nut on said axle spindle, said second washer being formed with a tab for engaging said keyway of the axle spindle to prevent rotation of the second washer about said axle spindle, said second washer further being formed with a plurality of mating features for mechanically engaging said radially inwardly extending teeth of said nut, said mating features including radially outwardly extending teeth formed on an outer periphery of the washer whereby substantial rotation of said nut is prevented, and a selected one of said washer and said nut being formed with at least one generally circumferentially-extending nub; and a pair of fasteners for securing said second washer to said nut by insertion of said fasteners into respective ones of said slots, whereby said nub aids contact by the fasteners with the second washer and the nut so that said second washer is secured to the nut and is removable by removal of said fasteners and application of inboard pressure against the second washer at a selected one of said slot relief areas of the nut.

12. The axle spindle nut assembly of claim 11, in which the number of said teeth formed on said second washer outer periphery is greater than the number of said teeth formed in said recess of said nut outboard surface.

13. The axle spindle nut assembly of claim 11, in which said first washer is formed with a tab for engaging said keyway of said axle spindle to prevent rotation of the first washer about said axle spindle.

14. The axle spindle nut assembly of claim 11, in which said first washer is further formed with graduations, and in which said nut is formed with an indicator mark, whereby the position of said indicator mark relative to said graduations indicates the rotational position of said nut.

15. The axle spindle nut assembly of claim 11 in which said at least one generally circumferentially-extending nub is a continuous nub extending along an entire inner periphery of a selected one of said nut recess and said second washer.

16. The axle spindle nut assembly of claim 11, in which said at least one generally circumferentially-extending nub is a continuous nub extending along an entire inner periphery of a selected one of said nut recess and said second washer, and in which said nub is formed with spaced-apart opposed relief areas.

17. The axle spindle nut assembly of claim 11, in which said at least one generally circumferentially-extending nub is a pair of opposed, generally arcuate-shaped nubs, each one of said nubs extending along a portion of an inner periphery of a selected one of said nut recess and said second washer.

18. The axle spindle nut assembly of claim 11, in which said at least one generally circumferentially-extending nub has a cross-sectional generally curved-shape.

19. The axle spindle nut assembly of claim 11, in which said at least one circumferentially-extending nub has a cross-sectional generally triangular-shape.

* * * * *

UNITED STATES PATENT AND TRADEMARK OFFICE
CERTIFICATE OF CORRECTION

PATENT NO.         : 8,016,531 B2                                   Page 1 of 1
APPLICATION NO.    : 12/482551
DATED              : September 13, 2011
INVENTOR(S)        : Jay White, Jeff Morris and Don Hester It is certified that error appears in the above-identified patent and that said Letters Patent is hereby corrected as shown below:

Column 32:
In Claim 11, line 39, the phrase "assembly a securing" should read --assembly securing--.

Signed and Sealed this
Fifteenth Day of November, 2011

David J. Kappos
*Director of the United States Patent and Trademark Office*